US010628490B2

(12) United States Patent
Yakout et al.

(10) Patent No.: US 10,628,490 B2
(45) Date of Patent: Apr. 21, 2020

(54) TECHNIQUES FOR DIGITAL ENTITY CORRELATION

(71) Applicant: Microsoft Technology Licensing, LLC, Redmond, WA (US)

(72) Inventors: Mohamed Yakout, Redmond, WA (US); Kaushik Chakrabarti, Bellevue, WA (US); Maria Pershina, New York, NY (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 654 days.

(21) Appl. No.: 14/932,983

(22) Filed: Nov. 5, 2015

(65) Prior Publication Data
US 2017/0132329 A1 May 11, 2017

(51) Int. Cl.
*G06F 16/901* (2019.01)

(52) U.S. Cl.
CPC .............. *G06F 16/9024* (2019.01)

(58) Field of Classification Search
CPC .............. G06F 17/30958; G06F 16/9024
See application file for complete search history.

(56) References Cited

U.S. PATENT DOCUMENTS

| 9,256,682 B1 * | 2/2016 | Li ............... G06F 17/30958 |
| 2009/0024615 A1 | 1/2009 | Pedro et al. | |
| 2014/0046934 A1 * | 2/2014 | Zhou ............ G06F 17/30864 707/723 |
| 2014/0280200 A1 * | 9/2014 | Dwan ............ G06F 16/2477 707/746 |
| 2014/0282219 A1 * | 9/2014 | Haddock ........ G06F 17/30731 715/781 |

(Continued)

FOREIGN PATENT DOCUMENTS

WO 2014127500 A1 8/2014

OTHER PUBLICATIONS

Zhang, et al., "Principled Graph Matching Algorithms for Integrating Multiple Data Sources", In Journal of IEEE Transactions on Knowledge and Data Engineering, vol. 26, Feb. 2014, pp. 1-14.

(Continued)

*Primary Examiner* — Alford W Kindred
*Assistant Examiner* — Lin Lin M Htay

(57) ABSTRACT

Techniques for using digital entity correlation to generate a composite knowledge graph from constituent graphs. In an aspect, digital attribute values associated with primary entities may be encoded into primitives, e.g., using a multi-resolution encoding scheme. A pairs graph may be constructed, based on seed pairs calculated from correlating encoded primitives, and further expanded to include subjects and objects of the seed pairs, as well as pairs connected to relationship entities. A similarity metric is computed for each candidate pair to determine whether a match exists. The similarity metric may be based on summing a weighted landing probability over all primitives associated directly or indirectly with each candidate pair. By incorporating primitive matches from not only the candidate pair but also from pairs surrounding the candidate pair, entity matching may be efficiently implemented on a holistic basis.

20 Claims, 14 Drawing Sheets

(56) References Cited

U.S. PATENT DOCUMENTS

2015/0039611 A1    2/2015   Deshpande et al.
2015/0379414 A1*   12/2015   Yeh .................. G06F 17/30958
                                                                                                        706/11

OTHER PUBLICATIONS

Bhattacharya, et al., "Entity Resolution in Graphs", In Technical Report, Oct. 27, 2005, 21 pages.

Köpcke, et al., "Frameworks for Entity Matching: A Comparison", In Journal of Data & Knowledge Engineering, vol. 69, Issue 2, Feb. 2010, 14 pages.

Chen, et al., "A Learning Method for Entity Matching", In Proceedings of 10th International Workshop on Quality in Databases, Aug. 27, 2012, 7 pages.

Bhattacharya, et al., "Collective Entity Resolution in Relational Data", In Journal of ACM Transactions on Knowledge Discovery from Data, vol. 1, Issue 1, Mar. 2007, pp. 1-35.

Chen, et al., "Adaptive Graphical Approach to Entity Resolution", In Proceedings of ACM IEEE Joint Conference on Digital Libraries, Jun. 17, 2007, 10 pages.

Stefanidis, Kostas, "Resolving Entities in the Web", Retrieved on: Jul. 31, 2015 Available at: http://europe.rd-alliance.org/sites/default/files/Stefanidis-RDA15.pdf.

Lee, et al., "Web Scale Taxonomy Cleansing", In Proceedings of 37th International Conference on Very Large Data Bases Endowment, vol. 4, No. 12, Aug. 29, 2011, pp. 1295-1306.

Pujara, et al., "Probabilistic Models for Collective Entity Resolution between Knowledge Graphs", Published on: Mar. 17, 2015 Available at: http://www.cs.ubc.ca/~murphyk/Papers/pujara_baylearn14_cr.pdf.

Kardes, et al., "Graph-based Approaches for Organization Entity Resolution in MapReduce", In Proceedings of TextGraphs-8 Workshop, Oct. 18, 2013, pp. 70-78.

Liu, et al., "On the Parameterized Complexity of Labelled Correlation Clustering Problem", In Proceedings of 20th International Computing and Combinatorics Conference, Aug. 4, 2014, pp. 276-278.

Wang, et al., "Probabilistic Estimates of Attribute Statistics and Match Likelihood for People Entity Resolution", In Proceedings of IEEE International Conference on Big Data, Oct. 27, 2014, 8 pages.

Wang, Hongzhi, "Duplicate Record Detection for Data Integration", In Publication IGI Global, Retrieved on: Jul. 31, 2015, pp. 339-358.

Pujara, et al., "Building Dynamic Knowledge Graphs", In Proceedings of 4th Workshop on Automated Knowledge Base Construction, Dec. 13, 2013, 5 pages.

Rao, et al., "Entity Linking: Finding Extracted Entities in a Knowledge Base", In Publication of Springer Berlin Heidelberg, Jul. 31, 2015, pp. 1-21.

Ananthakrishna, et al., "Eliminating Fuzzy Duplicates in Data Warehouses", In Proceedings of the 28th international conference on Very Large Data Bases, Aug. 20, 2002, 12 pages.

Babcock, et al., "Towards a Robust Query Optimizer: A Principled and Practical Approach", In Proceedings of the ACM SIGMOD international conference on Management of data, Jun. 14, 2005, pp. 119-130.

Bhattacharya, et al., "A Latent Dirichlet Model for Unsupervised Entity Resolution", In Proceedings of the Sixth SIAM International Conference on Data Mining, Apr. 20, 2006, 12 pages.

Böhm, et al., "Linda: Distributed Web-of-Data-Scale Entity Matching", In Proceedings of the 21st ACM international conference on Information and knowledge management, Oct. 29, 2012, pp. 2104-2108.

Carbonetto, et al., "Non-parametric Bayesian Logic", In Proceedings of the Twenty-First Conference on Uncertainty in Artificial Intelligence, Jul. 26, 2005, 9 pages.

Cohen, et al., "Learning to Match and Cluster Large High-Dimensional Data Sets for Data Integration", In Proceedings of the eighth ACM SIGKDD international conference on Knowledge discovery and data mining, Jul. 23, 2002, pp. 475-480.

Culotta, et al., "Joint Deduplication of Multiple Record Types in Relational Data", In Proceedings of the 14th ACM international conference on Information and knowledge management, Oct. 31, 2005, pp. 257-258.

Dong, et al., "Reference Reconciliation in Complex Information Spaces", In Proceedings of the ACM SIGMOD international conference on Management of data, Jun. 14, 2005, pp. 85-96.

Fellegia, et al., "A Theory of Record Linkage", In Journal of the American Statistical Association, vol. 64, Issue 328, Oct. 4, 2012, pp. 59-79.

Fogaras, et al., "Towards Scaling Fully Personalized PageRank", In Third International Workshop Algorithms and Models for the Web-Graph, Oct. 16, 2004, 13 pages.

Noy, et al., "PROMPT: Algorithm and Tool for Automated Ontology Merging and Alignment", In Proceedings of the Seventeenth National Conference on Artificial Intelligence and Twelfth Conference on Innovative Applications of Artificial Intelligence, Jul. 30, 2000, 6 pages.

Gale, et al., "College Admissions and the Stability of Marriage", In Proceedings of the American Mathematical Monthly, vol. 69, No. 1, Jan. 1962, pp. 9-15.

Hall, et al., "Unsupervised Deduplication using Cross-Field Dependencies", In Proceedings of 14th ACM SIGKDD International Conference on Knowledge Discovery and Data Mining, Aug. 24, 2008, pp. 310-317.

Hernandez, et al., "The Merge/Purge Problem for Large Databases", In Proceedings of ACM SIGMOD International Conference on Management of Data, Jun. 1995, pp. 127-138.

Kalashnikov, et al., "Exploiting Relationships for Domain-Independent Data Cleaning", In Proceedings of SIAM International Conference on Data Mining, Apr. 21, 2005, pp. 1-12.

McCallum, et al., "Efficient Clustering of High-Dimensional Data Sets with Application to Reference Matching", In Proceedings of Sixth ACM SIGKDD International Conference on Knowledge Discovery and Data Mining, Aug. 20, 2000, pp. 169-178.

McCallum, et al., "Conditional Models of Identity Uncertainty with Application to Noun Coreference", In Proceedings of Advances in Neural Information Processing Systems, Dec. 13, 2004, 8 pages.

Newcombe, et al., "Automatic Linkage of Vital Records", In Journal of American Association for the Advancement of Science, vol. 130, No. 3381, Oct. 16, 1959, pp. 7-12.

Pasula, et al., "Identity Uncertainty and Citation Matching", In Proceedings of Advances in Neural Information Processing Systems, Dec. 9, 2002, 8 pages.

Rastogi, et al., "Large-Scale Collective Entity Matching", In Proceedings of 37th International Conference on Very Large Data Bases, vol. 4, No. 4, Aug. 29, 2011, pp. 208-218.

Chaudhuri, et al., "Robust Identification of Fuzzy Duplicates", In Proceedings of 21st International Conference on Data Engineering, Apr. 5, 2005, 12 pages.

Singla, et al., "Multi-Relational Record Linkage", In Proceedings of KDD Workshop on Multi-Relational Data Mining, Aug. 22, 2004, 18 pages.

Singla, et al., "Entity Resolution with Markov Logic", In Proceedings of the Sixth International Conference on Data Mining, Dec. 18, 2006, pp. 1-11.

Whang, et al., "Entity Resolution with Iterative Blocking", In Proceedings of ACM SIGMOND International Conference on Management of Data, Jun. 29, 2009, pp. 219-231.

"International Search Report and Written Opinion Issued in PCT Application No. PCT/US2016/060016", dated Feb. 21, 2017, 11 Pages.

"International Preliminary Report on Patentability Issued in PCT Application No. PCT/US2016/060016", dated Nov. 17, 2017, 7 Pages.

\* cited by examiner

TECHNIQUES FOR DIGITAL ENTITY CORRELATION

BACKGROUND

A knowledge graph is a way of representing information about objects that captures important relationships between those objects. Knowledge graphs are used in digital information retrieval and organization systems to store and organize potentially vast amounts of information, such as found on the Internet. To combine knowledge from multiple, heterogeneous sources into a unified, mineable knowledge graph, it is important to provide effective techniques for digital entity matching. Entity matching is the task of determining if two entities in a data set refer to the same real-world object.

The design of computers for performing automated entity matching is challenging, as two digital entities referring to the same object may nevertheless contain different attribute sets, e.g., due to differences in attribute selection, formatting inconsistencies, inaccuracies, etc., across different knowledge graphs. Furthermore, efficient computational techniques are needed to process the sheer volume of digital entities contained in large-scale knowledge graphs associated with different knowledge domains (covering, e.g., history, science, entertainment, etc.), such as found on the Internet.

Existing entity matching techniques include digitally comparing the immediate attributes of two entities with each other, without necessarily utilizing further attributes associated with the entities' connections to other entities. In some cases, this may not utilize all the available information to obtain an accurate match. Furthermore, existing entity matching techniques are largely queue-based, wherein top candidate matches are entered and stored in a queue. Such techniques have significant hardware and memory requirements, and may not scale well to large knowledge graphs having millions or even billions of digital entities.

It would thus be desirable to provide techniques for digital entity matching that capture not only localized but holistic characteristics of the knowledge graph entities, while implementing the required computations in a highly efficient manner.

SUMMARY

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

Briefly, various aspects of the subject matter described herein are directed towards techniques for generating a composite knowledge graph from constituent graphs using digital entity correlation. In an aspect, attribute values associated with primary entities in the knowledge graphs may be encoded into primitives using a multi-resolution encoding scheme. Based on the encoded primitives, a pairs graph may be constructed by comparing the encoded primitives between pairs of entities to identify "seed pairs." The pairs graph may be expanded to also include subject and object entities related to the seed pairs, as well as entities related to "relationship entities" of the graphs.

Based on the constructed pairs graph, a similarity metric may be computed for each candidate pair quantifying the similarity between the entities of a pair. In an aspect, the similarity metric may be calculated by summing a weighted landing probability over all primitives associated directly or indirectly with a candidate pair. The calculated similarity metrics may be propagated to other connected candidate pairs. Matching resolution may be performed on the candidate pairs based on the computed similarity metrics to determine entity matches.

Other advantages may become apparent from the following detailed description and drawings.

DETAILED DESCRIPTION

Various aspects of the technology described herein are generally directed towards techniques for generating a composite knowledge graph from constituent graphs featuring digital entity correlation. The detailed description set forth below in connection with the appended drawings is intended as a description of exemplary means "serving as an example, instance, or illustration," and should not necessarily be construed as preferred or advantageous over other exemplary aspects. The detailed description includes specific details for the purpose of providing a thorough understanding of the exemplary aspects of the invention. It will be apparent to those skilled in the art that the exemplary aspects of the invention may be practiced without these specific details. In some instances, well-known structures and devices are shown in block diagram form in order to avoid obscuring the novelty of the exemplary aspects presented herein.

Figure 1:
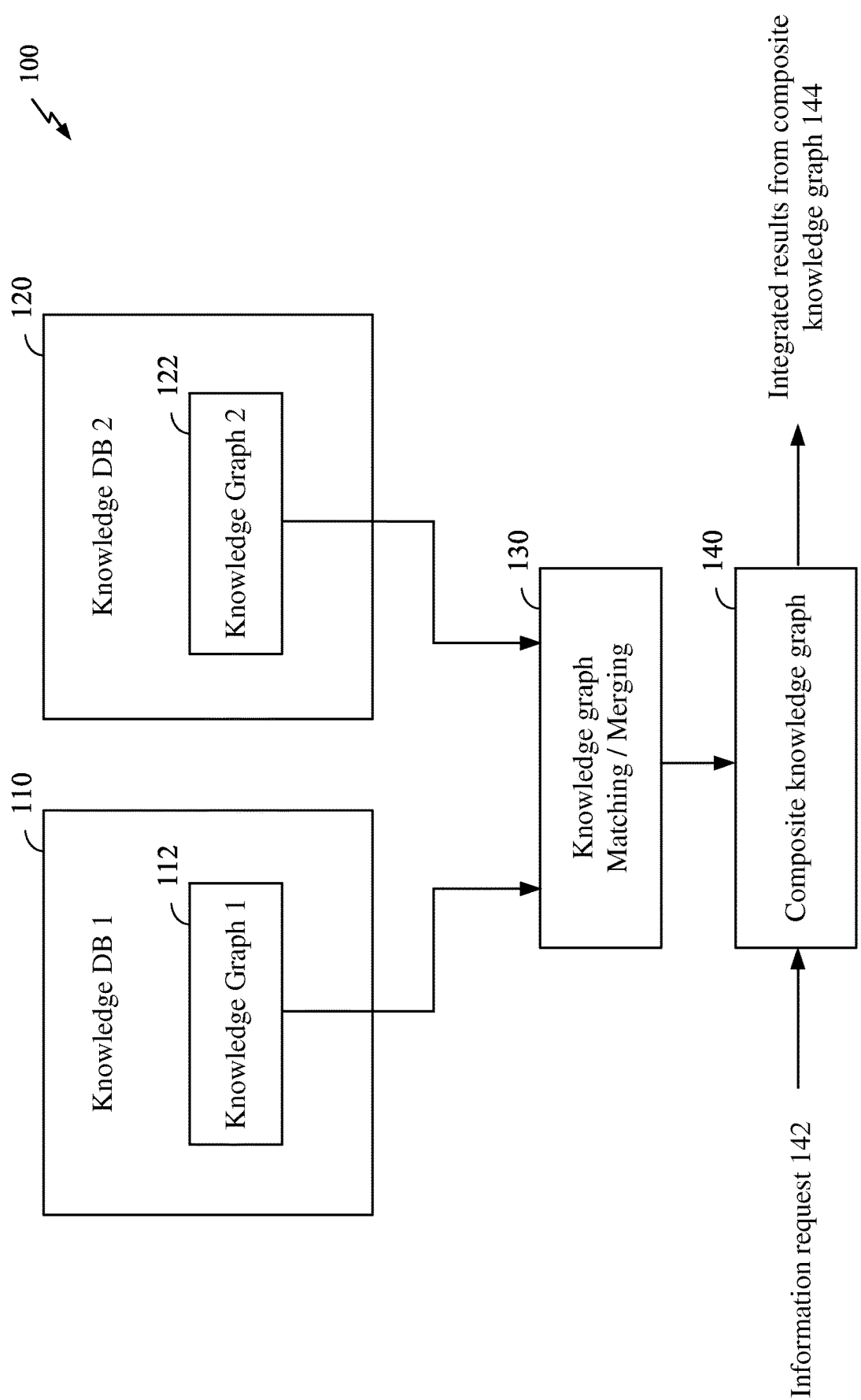
FIG. 1 shows an exemplary system for integrating information from constituent knowledge graphs.

FIG. 1 shows an exemplary system 100 for integrating information from constituent knowledge graphs. Note system 100 is shown for illustrative purposes only, and is not meant to limit the scope of the present disclosure, e.g., to any particular number of knowledge databases, graphs, partitioning of functional blocks, etc.

In FIG. 1, first knowledge database 110 includes first knowledge graph 112, and second knowledge database 120 includes second knowledge graph 122. Each of knowledge databases 110, 120 may correspond to, e.g., a hardware and/or software system storing information in the form of organized knowledge graphs 112, 122. In certain exemplary embodiments, databases 110, 120 may further provide a user interface (not shown) to access the underlying stored information, e.g., to retrieve information from knowledge graphs 112, 122, or to write information to, or otherwise modify, the stored knowledge graphs. In an exemplary embodiment, either or both of databases 110, 120 may correspond to, e.g., one or more server computers communicating with one or more users using an Internet protocol.

Information stored in knowledge graphs 112, 122 may include knowledge associated with one or more knowledge domains. Such domains may include, but are not limited to, knowledge domains covering sports, movies, music, history, science, engineering, etc., and may generally encompass any types of knowledge domains for which information is obtainable and representable in knowledge graph format. A specific illustrative format for representing knowledge graphs is described hereinbelow with reference to FIGS. 2 and 3, although it will be appreciated that techniques of the present disclosure may generally be applicable to any other types of knowledge graph formats.

Figure 2:
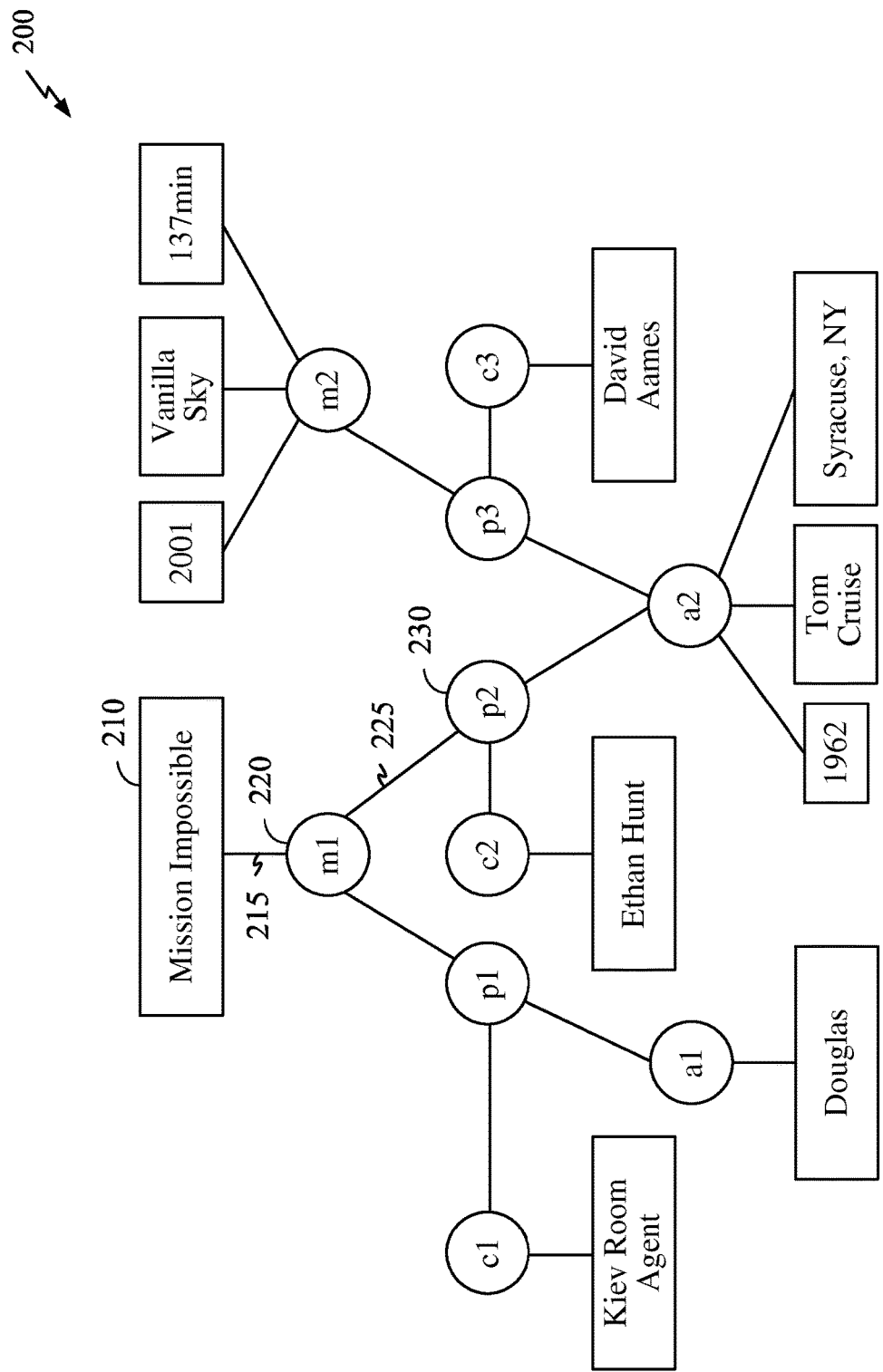
FIGS. 2 and 3 depict constituent knowledge graphs having an illustrative format according to the present disclosure.

FIG. 2 depicts a knowledge graph 200 having an illustrative format according to the present disclosure. Note knowledge graph 200 is a simplified example from the domain of entertainment knowledge, e.g., movies. It will be understood that knowledge graph 200 is described only for the purpose of illustrating certain aspects of the present disclosure, and is greatly simplified for ease of discussion. Knowledge graph 200 is not meant to limit the scope of the present disclosure to any particular knowledge domains, types, structures, sizes, number of nodes or connections, etc. Furthermore, while illustrative knowledge graph formats are described hereinbelow, it will be appreciated that techniques of the present disclosure may readily be applied and/or extended to alternative knowledge graph formats not explicitly disclosed herein, and such alternative exemplary embodiments are contemplated to be within the scope of the present disclosure.

In FIG. 2, each node having a circular shape is also denoted herein as an "entity." It will be understood that an "entity" encompasses a digital entity, i.e., a digital representation of a real-world object or abstraction for processing by a digital computer. For example, nodes 220, 230 (with labels "m1" and "p2," respectively) are examples of entities. Each node having a rectangular shape is also denoted herein as an "attribute," with the text or other information contained therein corresponding to the "value" of the attribute. For example, node 210 is an example of an attribute having text value "Mission Impossible." It will be understood that attribute values are represented in digital form, and may also be referred to as "digital attribute values" herein. Lines or "edges" such as 215, 225 may generally denote an association between an entity and an attribute (e.g., edge 215), or an association between two entities (e.g., edge 225).

Each entity in knowledge graph 200 may further be classified as either a primary entity or a relationship entity.

A primary entity may be defined by association with one or more "explicit" attributes, e.g., an attribute having a value or denotation referenced outside the context of the knowledge graph. For example, node 220, also labeled "m1," corresponds to a movie entity. As node 220 is associated with a movie name (i.e., "Mission Impossible" 210), which is an explicit attribute, m1 is properly considered a "primary entity."

In contrast, a relationship entity need not be associated with an explicit attribute having value or denotation referenced outside the knowledge graph. Relationship entities may exist in the knowledge graph to connect primary entities, and to characterize the nature of such connection between primary entities. For example, node 230, also labeled "p2," corresponds to a "performance" entity, and may characterize the performance by an actor or actress a2 of some role featured in the movie m1. It will be appreciated that the performance p2 is not itself associated with an explicit attribute, and so the performance p2 is properly considered a "relationship" entity.

The entities and edges present in knowledge graph 200 may be totally specified using a list of descriptors having a [subject, predicate, object] format, e.g., a Resource Description Framework (RDF) triple. In particular, the "subject" may correspond to the name of the entity, the "predicate" may denote an attribute of the subject, and the "object" may denote the value of the attribute. For example, a descriptor such as [m1, entity.class, movie] may indicate that entity m1 has a class (or type) corresponding to a movie. The descriptor [m1, movie.name, "Mission Impossible"] may indicate that entity m1 has a movie name "Mission Impossible." Note the descriptor [m1, movie.name, "Mission Impossible"] is also graphically shown in FIG. 2 as edge 215, while the descriptor [m1, entity.class, movie] is omitted from FIG. 2 for ease of illustration, even though it may be considered part of knowledge graph 200.

Note the subject attribute denoted by "predicate" may also generally encompass a "relationship" attribute, in which case the "object" may correspond to another entity with which the subject has the designated type of relationship. For example, a descriptor such as [p1, performance.actor, a1] may indicate that the performance represented by entity p1 has an "actor in a performance" relationship with the actor represented by entity a1.

Based on the definitions above, information pertaining to knowledge graph 200 may be further specified using the RDF triple format as shown in Table 1 hereinbelow. Note for ease of illustration, not all information in Table 1 is graphically displayed in FIG. 2.

TABLE 1

Sample Specification of Knowledge Graph 200

| Subject | Predicate | Object |
| --- | --- | --- |
| m1 | entity.class | Movie |
| m1 | movie.name | "Mission Impossible" |
| p1 | entity.class | performance |
| p1 | movie.performance | m1 |
| p2 | entity.class | performance |
| p2 | movie.performance | m1 |
| p1 | performance.character | c1 |
| c1 | entity.class | character |
| c1 | character.name | "Kiev Room Agent" |
| p1 | performance.actor | a1 |
| a1 | entity.class | actor |
| a1 | actor.name | "Douglas" |
| p2 | performance.character | c2 |

TABLE 1-continued

Sample Specification of Knowledge Graph 200

| Subject | Predicate | Object |
|---|---|---|
| c2 | entity.class | character |
| c2 | character.name | "Ethan Hunt" |
| p2 | performance.actor | a2 |
| a2 | entity.class | actor |
| a2 | actor.name | "Tom Cruise" |
| a2 | actor.birthdate | 1962 |
| a2 | actor.birthplace | Syracuse NY |
| m2 | entity.class | movie |
| m2 | movie.name | "Vanilla Sky" |
| m2 | movie.releasedate | 2001 |
| m2 | movie.runtime | 137 min |
| p3 | entity.class | performance |
| p3 | movie.performance | m2 |
| p3 | performance.character | c3 |
| c3 | entity.class | character |
| c3 | character.name | "David Aames" |
| p3 | performance.actor | a2 |

It will be appreciated from the description hereinabove that knowledge graph 200 includes information pertaining to the movie "Mission Impossible," actors appearing in the movie (including "Tom Cruise" and "Douglas"), as well as their respective character roles in the movie. Knowledge graph 200 further indicates that actor "Tom Cruise" also appeared in the movie "Vanilla Sky."

Figure 3:
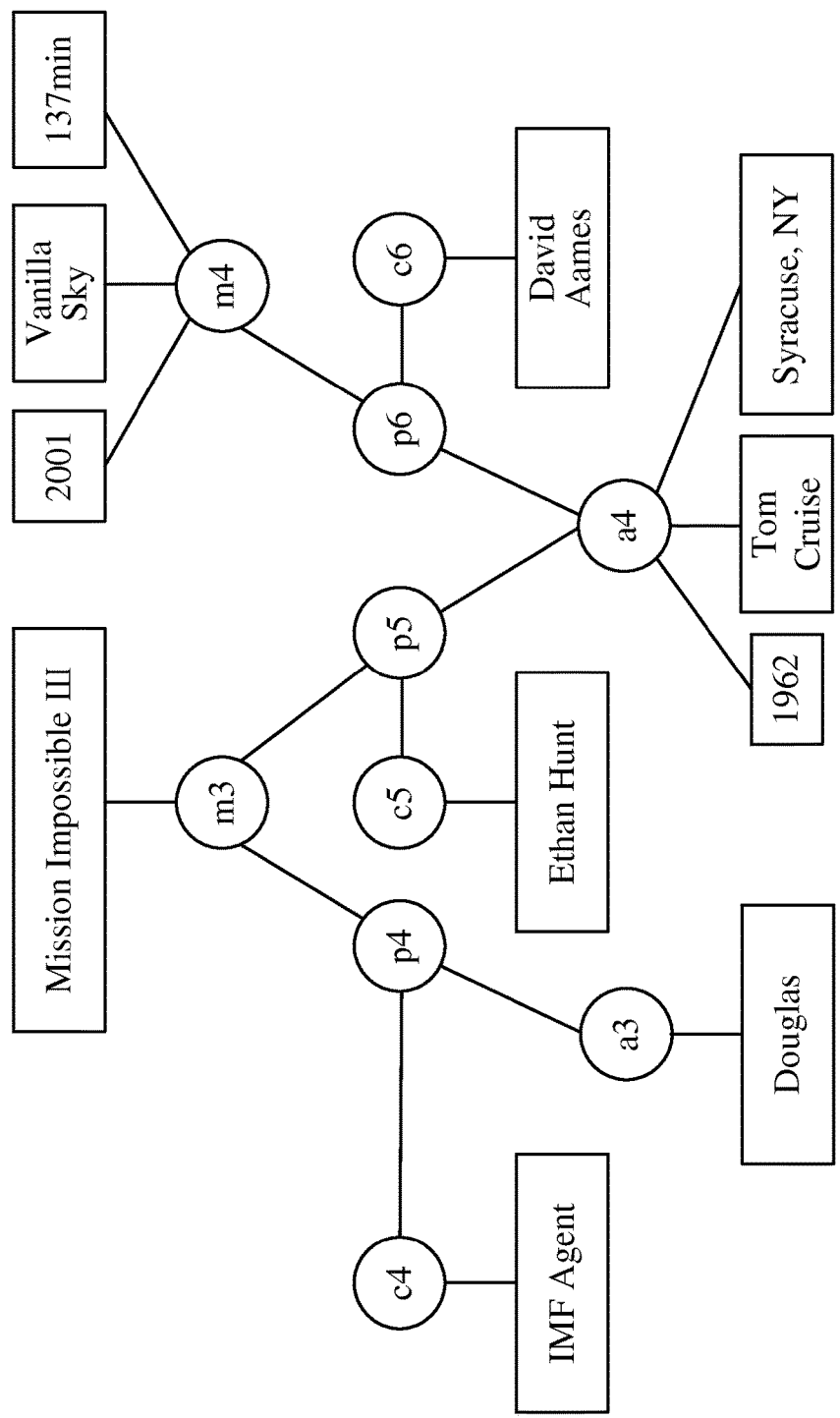

FIG. 3 depicts a knowledge graph 300 distinct from knowledge graph 200. In an exemplary embodiment, knowledge graph 300 may reside in a different knowledge database from knowledge graph 200, e.g., knowledge graph 200 corresponding to first knowledge graph 112 in first knowledge database 110, and knowledge graph 300 corresponding to second knowledge graph 114 in second knowledge graph 122 in second knowledge database 120. Table 2 hereinbelow specifies information pertaining to knowledge graph 300 in FIG. 3, using the RDF triple format described hereinabove with reference to FIG. 2. Again note for ease of illustration, not all information in Table 2 is graphically displayed in FIG. 3.

TABLE 2

Sample Specification of Knowledge Graph 300

| Subject | Predicate | Object |
|---|---|---|
| m3 | entity.class | Movie |
| m3 | movie.name | "Mission Impossible III" |
| p4 | entity.class | performance |
| p4 | movie.performance | m3 |
| p5 | entity.class | performance |
| p5 | movie.performance | m3 |
| p4 | performance.character | c4 |
| c4 | entity.class | character |
| c4 | character.name | "Agent" |
| p4 | performance.actor | a3 |
| a3 | entity.class | actor |
| a3 | actor.name | "Douglas" |
| p5 | performance.character | c5 |
| c5 | entity.class | character |
| c5 | character.name | "Ethan Hunt" |
| p5 | performance.actor | a4 |
| a4 | entity.class | actor |
| a4 | actor.name | "Tom Cruise" |
| a4 | actor.birthdate | 1962 |
| a4 | actor.birthplace | Syracuse NY |
| m4 | entity.class | movie |
| m4 | movie.name | "Vanilla Sky" |
| m4 | movie.releasedate | 2001 |
| m4 | movie.runtime | 137 min |
| p6 | entity.class | performance |
| p6 | movie.performance | m4 |
| p6 | performance.character | c6 |
| c6 | entity.class | character |
| c6 | character.name | "David Aames" |
| p6 | performance.actor | a4 |

To integrate knowledge from multiple, heterogeneous sources such as knowledge graph 112 and knowledge graph 122 into a unified, mineable framework, it is desirable to match and merge the information found in the constituent knowledge graphs, and leverage the pre-existing relationships and information present in the constituent knowledge graphs. In particular, returning to FIG. 1, block 130 may perform knowledge graph matching/merging on knowledge graphs 112, 122 to generate composite knowledge graph 140. Given composite knowledge graph 140, a digital request 142 for information from a knowledge database may accordingly be accurately and efficiently addressed by entities and relationships derived from both first knowledge graph 112 and second knowledge graph 122. Digital request 142 may be formulated, e.g., in terms of one or more search strings represented in digital form for processing using the techniques described hereinbelow.

In an aspect of processing performed by block 130, entity matching or correlation determines whether two separately named entities refer to the same underlying real-world object, e.g., are different instances or representations of the same object. In such cases, it would be desirable to match those entities with each other, and identify them as corresponding to a single object. Thus the composite knowledge graph thus advantageously integrates diverse elements of knowledge across the separate knowledge databases, and further reduces redundancy arising from possible overlap or duplication of records in the separate knowledge databases. In the Specification and in the Claims, "entity matching" may also be referred to as "entity correlation."

Figure 4:
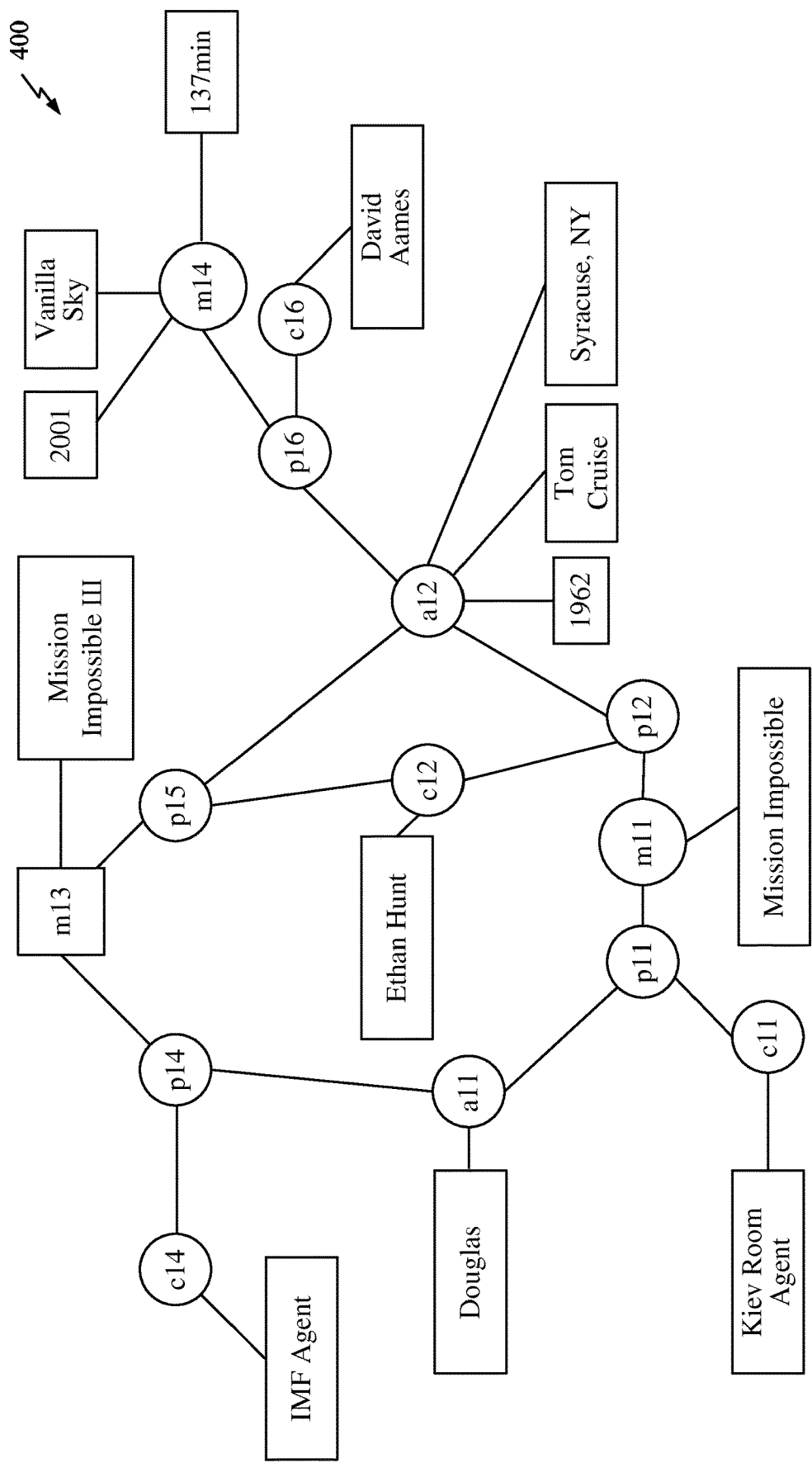
FIG. 4 illustrates a composite knowledge graph in which entities and relationships from constituent knowledge graphs have been matched and merged.

For example, FIG. 4 illustrates a composite knowledge graph 400 in which entities and relationships from constituent knowledge graphs 200, 300 have been matched and merged. In particular, node m2 in graph 200 and node m4 in graph 300 have been matched as corresponding to the same movie m14 ("Vanilla Sky") in merged graph 400. Other instances of matched entities include nodes a2 and a4 merged as node a12 (actor "Tom Cruise"), nodes c5 and c2 merged as node c12 (character "Ethan Hunt"), etc.

Note despite entity matching, nodes m1 (movie "Mission Impossible") and m3 (movie "Mission Impossible III") in FIGS. 2 and 3 are preserved as separate nodes m11 and m13, respectively, in FIG. 4. In particular, while movies m1 and m3 share a number of similarities in movie name, character lists, etc., they are nevertheless distinct movies. Thus it would be desirable for block 130 to identify nodes m1 and m3 as "not matching," and preserve their identities as separate entities in merged graph 400.

From the example described hereinabove, it will be appreciated that a difficulty in identifying two matching or non-matching entities lies in resolving differences between nodes having similar attributes (such as the movie names "Mission Impossible" and "Mission Impossible III"). Existing techniques for correlating entities may use only limited information to identify matches between two entities, e.g., movie titles or other individual entity attributes. Such techniques may not take advantage of information extracted from an entity's surrounding neighborhood, e.g., connections with other entities and attributes of such other entities, to determine whether a match exists. For example, the fact that the same actor "Tom Cruise" (e.g., actor entities sharing the same name and other biographical data) is associated with two separate movie entities titled "Vanilla Sky" (e.g., spanning two knowledge graphs) should improve the confidence of a match between those two movie entities. Similarly, the confidence of a match between two actor entities sharing the same name "Tom Cruise" may also be influenced by other entities to which they are connected, in a recursive fashion.

In another aspect, existing techniques for entity matching in knowledge graphs are often queue based, wherein candidate matches are stored into a priority queue. The prohibitive memory requirements of such queue-based techniques means they may not be readily adaptable to web-scale size knowledge graphs.

Figure 5:
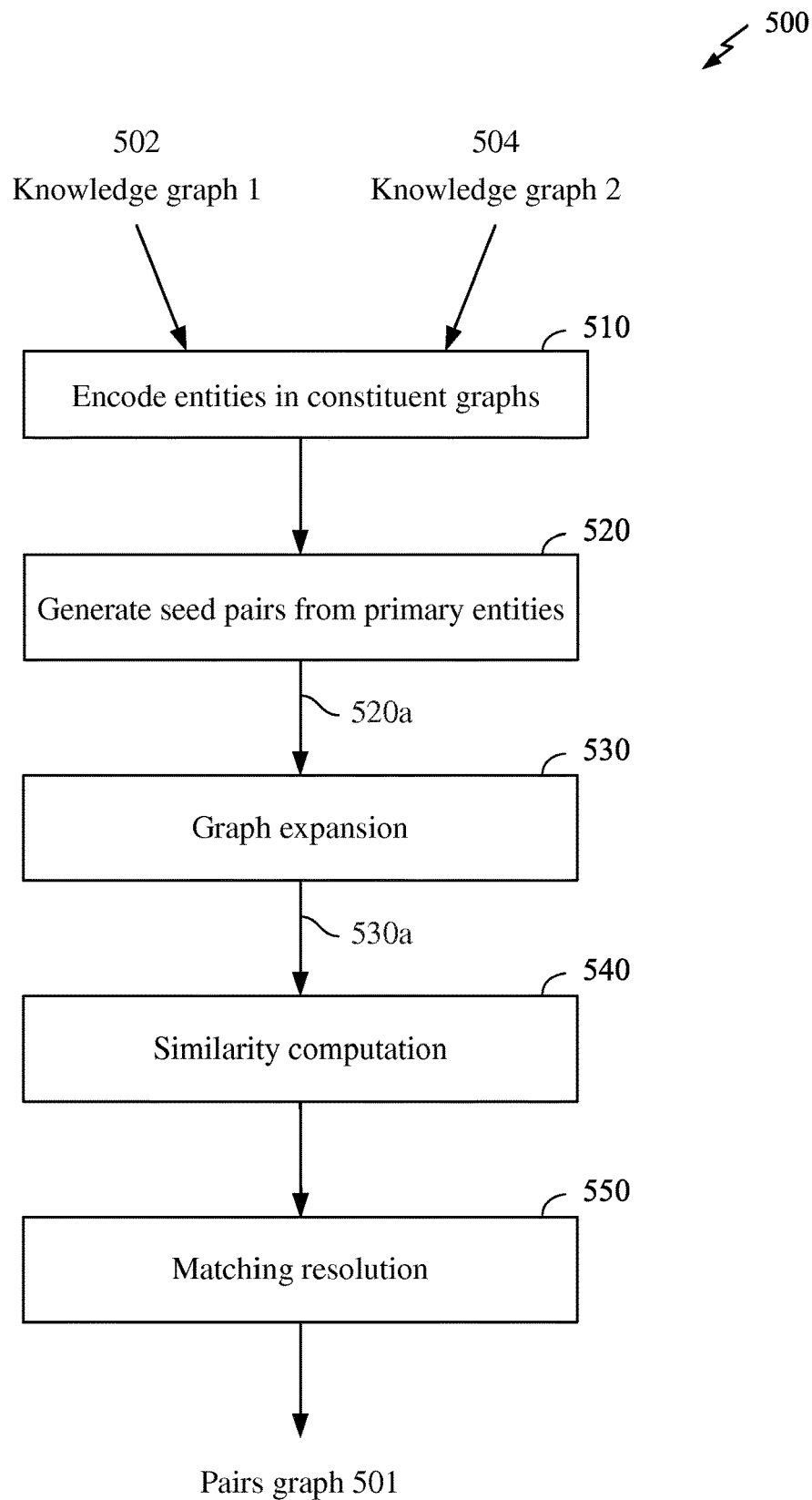
FIG. 5 illustrates an exemplary embodiment of a method for constructing a pairs graph according to the present disclosure.

FIG. 5 illustrates an exemplary embodiment of a method 500 for constructing a pairs graph 501 according to the present disclosure. Note FIG. 5 is shown for illustrative purposes only, and is not meant to limit the scope of the present disclosure to any particular methods shown.

In FIG. 5, first knowledge graph 502 and second knowledge graph 504 (also collectively denoted herein the "constituent" knowledge graphs) are received at block 510 (also denoted herein an "encoding block" or "encoder"), which encodes explicit attributes present in the knowledge graph entities using an optimized encoding scheme. In particular, information in graphs 502, 504 may initially be formatted using the RDF triple format described hereinabove, e.g., [subject, predicate, object].

In an exemplary embodiment, block 510 encodes the explicit attributes associated with each entity in knowledge graphs 502 and 504 using a "multi-resolution" encoding scheme. In particular, any explicit attribute may be encoded by generating a first output element having a lowest resolution overlapping with the attribute value, a second output element having a higher resolution overlapping with the attribute value, etc., up to a final output element having a highest resolution overlapping with the attribute value. The resulting set of output elements are then added to an output "bag of elements" for an entity. The bag of elements includes all encoded elements associated with an entity.

Attribute value types that may be encoded using multi-resolution encoding include numbers, dates/times, place names (e.g., {"New York," "Syracuse, N.Y.," "Syracuse, N.Y., USA"}), etc. Furthermore, arbitrary text strings may also be represented using the multi-level approach, wherein "lower resolution" in such cases may be understood to correspond to, e.g., individual words or smaller n-grams of a text string, while "higher resolution" may correspond to, e.g., longer concatenations of individual words, either in sequence or not in sequence.

In an exemplary embodiment, multi-resolution encoding may be specifically implemented according to a set of rules such as described below with reference to Table 3. Note the rules described in Table 3 are described for illustrative purposes only, and are not meant to limit the scope of the present disclosure to any particular implementation of multi-resolution encoding, or to any particular rules for encoding entity attribute values. It will be appreciated that certain of the rules described in Table 3 may readily be modified by one of ordinary skill of the art in view of the present disclosure, and such alternative exemplary embodiments are contemplated to be within the scope of the present disclosure.

TABLE 3

Entity Encoding Rules

| Explicit Attribute Type | Contribution to Output Bag of Elements |
|---|---|
| Text and String values | Rule 1) One element for every single word (or "token"); Rule 2) One element for original phrase; Rule 2a) One element for every distinct n-gram (e.g., n >= 2) of words or tokens within a sliding window of m tokens; Rule 3) One element for every Minhash. |
| Date and/or Time | Rule 4) One element for each precision level of date and/or time, from lowest precision to highest precision. Each element is cumulative of all lower precisions. |
| Numbers | Rule 5) One element for the number; Rule 6) One element for each of one or more successively lower precision rounded versions of the number. |
| URL | Rule 7) One element for each URL; Rule 8) One element for each normalized version of each URL. |
| Attribute-Value pairs | Rule 9) One element for concatenation of each element generated according to above rules with corresponding Attribute name. |
| Identity Attribute of an entity (if known) | Rule 10) Identity attribute values concatenated with each element generated according to above rules. |

In an exemplary embodiment, as described in Table 3, any explicit attribute having text or string values may generate a set of encoded elements (also denoted "primitives") including: one element for every single word (or "token") in the explicit attribute (per Rule 1), one element including the original phrase (per Rule 2), one element for every distinct pair (or n-gram) of words or tokens within a sliding window of m tokens (per Rule 2a), and one element for every Minhash (per Rule 3). It will be appreciated that a Minhash, or min-wise independent permutations locality sensitive hashing scheme, may denote a hash technique whereby similar text strings will have the same hash according to a probability based on the degree of similarity.

As an example of Rules 1 and 2, if an explicit attribute type such as "movie tagline" has the value "The Greatest Show on Earth," n=2, and m=5, then the output bag of elements generated may include the following elements: five elements {"The," "Greatest," "Show," "on," "Earth" } generated according to Rule 1), one element {"The Greatest Show on Earth" } according to Rule 2), and four 2-gram elements {"The Greatest," "Greatest Show," "Show on," "on Earth"} according to Rule 2a).

In an exemplary embodiment, as per Rule 4), any attribute having a date and/or time value may cause a set of elements to be generated including one element for each precision level of date provided, from lowest precision to highest precision, according to the multi-resolution encoding techniques described hereinabove. In an exemplary embodiment, each element may be cumulative of all lower precisions. For example, if the date is provided as YYYYMMDD, then 3 elements may be generated: {YYYY, YYYYMM, YYYYMMDD}. If the date is YYYYMM, then 2 elements are generated: {YYYY, YYYYMM}.

In an exemplary embodiment, as per Rules 5) and 6), any attribute having a number value may cause a set of elements to be generated including one element for the number, and one element for each of one or more successively lower precision rounded versions of the number. For example, if the number is 2128, then generated elements may include {2128, 2120, 2100}, etc.

In an exemplary embodiment, as per Rules 7) and 8), any attribute having a URL value may generate elements including one element for each URL, and one element for each normalized version of each URL.

In an exemplary embodiment, as per Rule 9), in addition to attribute values being encoded according to the rules given hereinabove (e.g., for text, dates and/or times, numbers, etc.), additional elements may further be generated wherein a corresponding Attribute name is concatenated with each of the elements generated according to the above rules. For example, if the "actor.name" Attribute of an actor entity has value "Tom Cruise," then in addition to the three elements generated according to the rule for "Text and String values," three additional elements may be generated as follows: {"actor.name: Tom", "actor.name: Cruise", "actor.name: Tom Cruise"}. In particular, each of the elements is concatenated with the name of the name of the corresponding Attribute, with a separation optionally denoted by a colon.

In an exemplary embodiment, as per Rule 10), elements generated for the value of a special attribute known as an "Identity Attribute" may further be concatenated with each element generated according to the rules hereinabove. For example, for an "actor" entity, the Attribute "actor.name" is considered to be a special Identity Attribute, in that it explicitly identifies the entity. Accordingly, the elements generated for the Identity Attribute may be concatenated with every other element generated for the entity according to the rules hereinabove. For example, if the Identity Attribute "actor.name" has value "Tom Cruise," then an additional set of elements generated may include, e.g., {"Tom: 1962," "Cruise: 1962," "Tom Cruise: 1962," "Tom: Syracuse," "Tom: Syracuse, N.Y."}, etc.

Based on the encoding scheme described hereinabove, it will be appreciated that entity matching, e.g., as performed at block 130 of FIG. 1, may proceed by correlating encoded elements of one entity with those of another entity. It will be appreciated that multi-resolution encoded elements such as described hereinabove advantageously eliminates the need for extensive rules and algorithms to otherwise identify matches between pairs of entities, e.g., derivation of optimum weights for each field of an entity using machine learning techniques, etc. Thus by selecting a priori the preferred dimensions of "resolution" for attribute values, multi-resolution encoding and correlation facilitate the determination of entity matches.

Returning to FIG. 5, after entities in knowledge graphs 502, 504 are encoded at block 510, the encoded knowledge graphs (including generated bags of elements) may be provided to block 520 (also denoted herein a "seed block"), which generates seed pairs 520*a* from primary entities. In particular, seed pair generation identifies pairs of primary entities (e.g., from separate knowledge graphs 502, 504) which are sufficiently similar based on an initially computed similarity metric.

Figure 6:
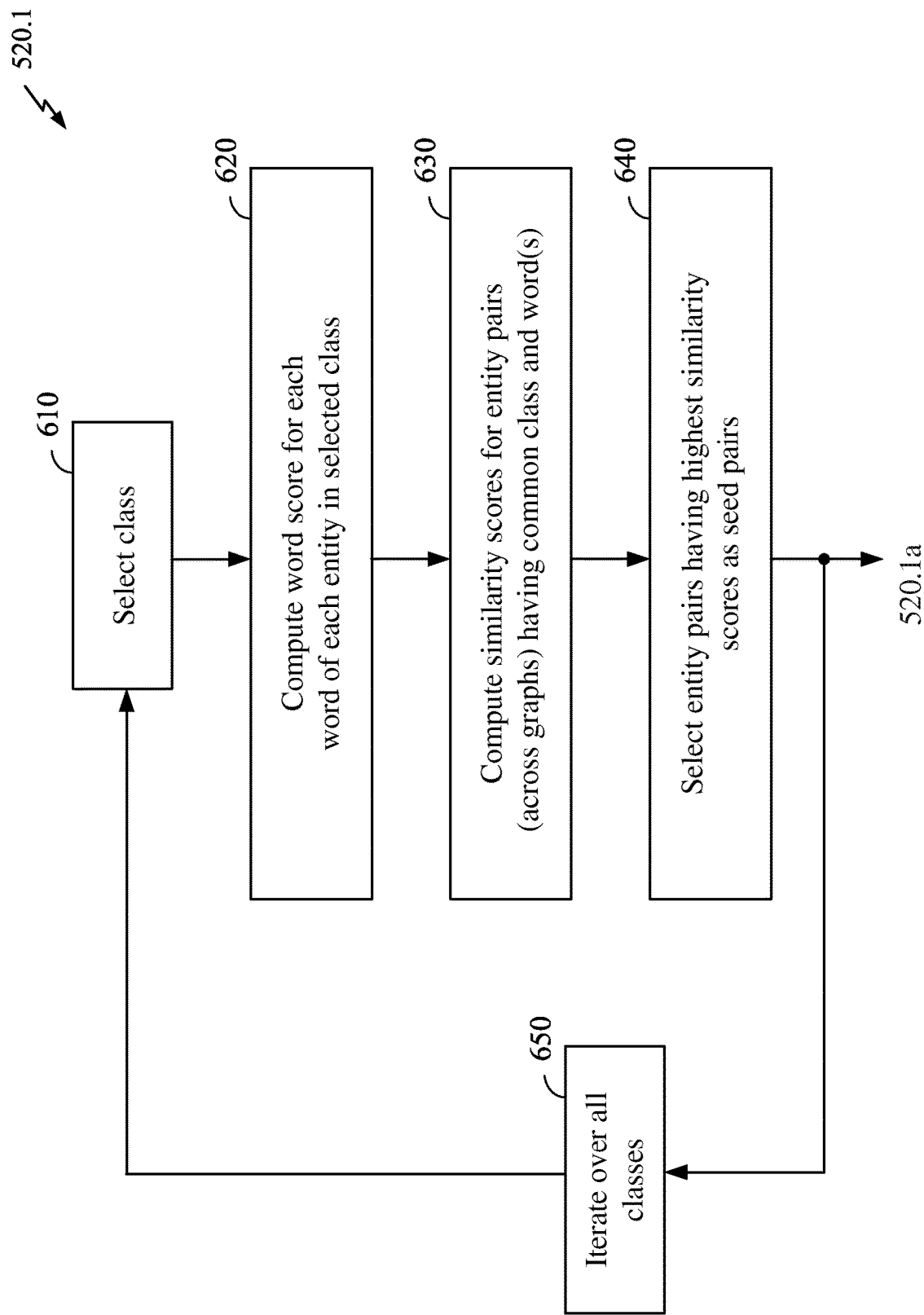
FIG. 6 illustrates an exemplary embodiment of a seed block.

FIG. 6 illustrates an exemplary embodiment 520.1 of block 520. In FIG. 6, at block 610, a specific entity class (e.g., movie, actor, etc.) is selected for further processing. In an exemplary embodiment, only classes associated with primary entities are selected at block 610.

At block 620, a word score is computed for each word or element in the bag of elements associated with each entity in the selected class.

In an exemplary embodiment, a word score for a word or element w in a first graph G1 may be based on an inverse document frequency (IDF) score calculated as follows (Equation 1):

$$IDF1(w, C) = \log \frac{|\{e \mid e \in G1, \text{Class}(e) = C\}|}{|\{e \mid e \in G1, w \in e, \text{Class}(e) = C\}|};$$

wherein C represents a specific class, e refers to an entity, and the operator |·| returns the number of elements in a set. It will be appreciated that IDF1 (w, C) is related to the inverse frequency of occurrence of w in the class C of a graph G1: the more often w occurs in C, the smaller the value of IDF1 (w, C). For example, in certain instances, a relatively common word such as "the" may have a lower IDF1 score than a less common word such as "mission." An IDF score IDF2 may be similarly calculated for a word or element w in a second graph G2.

At block 630, similarity metrics are computed for entity pairs having common class and word(s), wherein each entity of an entity pair is taken from a different graph.

In an exemplary embodiment, an initial similarity score between two entities e1, e2 from separate graphs sharing a single class C may be computed from the IDF scores described hereinabove as follows (Equation 2):

$$\text{sim}(e1, e2) = \Sigma_{\forall w \in (e1 \cap e2)} IDF1(w, C) \times IDF2(w, C);$$

wherein the indicated summation is performed over all words or elements w that are common to the two entities e1, e2.

At block 640, entity pairs {e1, e2} having the highest similarity scores computed at block 630 may be designated "seed pairs" 520.1*a*.

At block 650, re-iteration of blocks 610-640 may be performed over all classes C common to the two graphs.

In an exemplary embodiment, computation of word scores and similarity scores at blocks 620, 630 may be efficiently performed using, e.g., a MapReduce algorithm. Further optimization to the computations may include, e.g., discarding words with very low IDF scores (e.g., corresponding to "stop" words), and discarding entity pairs outside the k matches having the top scores.

Returning to FIG. 5, after seed pairs are generated from primary entities at block 520, the generated seed pairs may be provided to block 530 (also denoted herein an "expansion block"), which generates pairs graph 501 by expanding from the initial seed pairs 520*a* to incorporate other (e.g., non-primary or relationship) entities.

Figure 7:
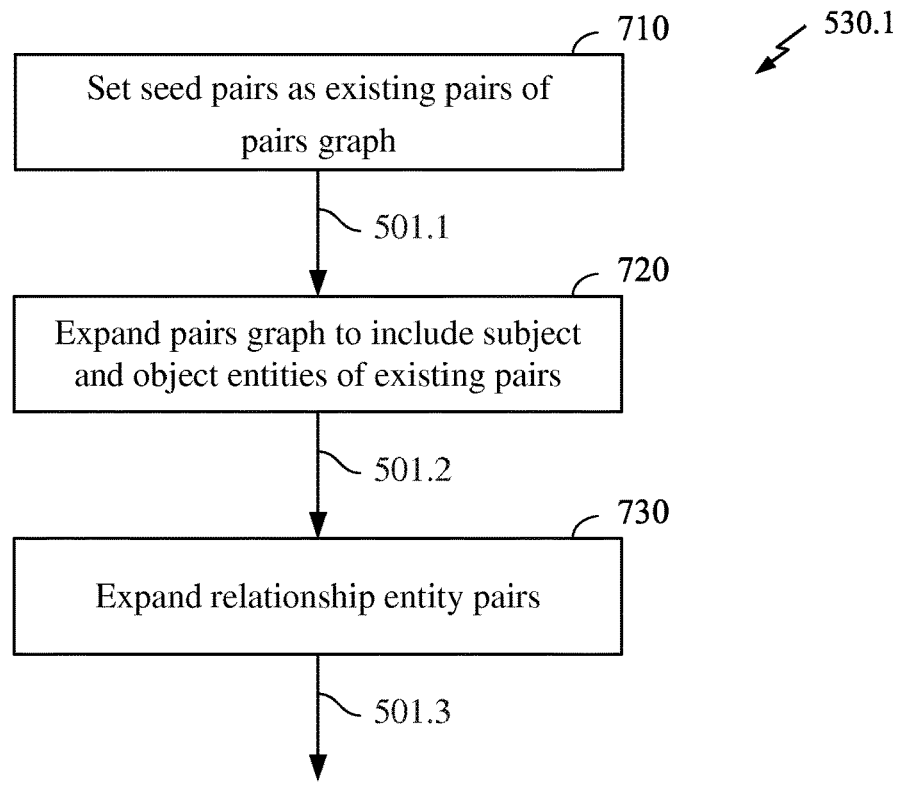
FIG. 7 illustrates an exemplary embodiment of an expansion block.

FIG. 7 illustrates an exemplary embodiment 530.1 of expansion block 530. In FIG. 7, at block 710, seed pairs 520*a* generated at block 520 are taken as "existing pairs" of the pairs graph 501.

Figure 8:
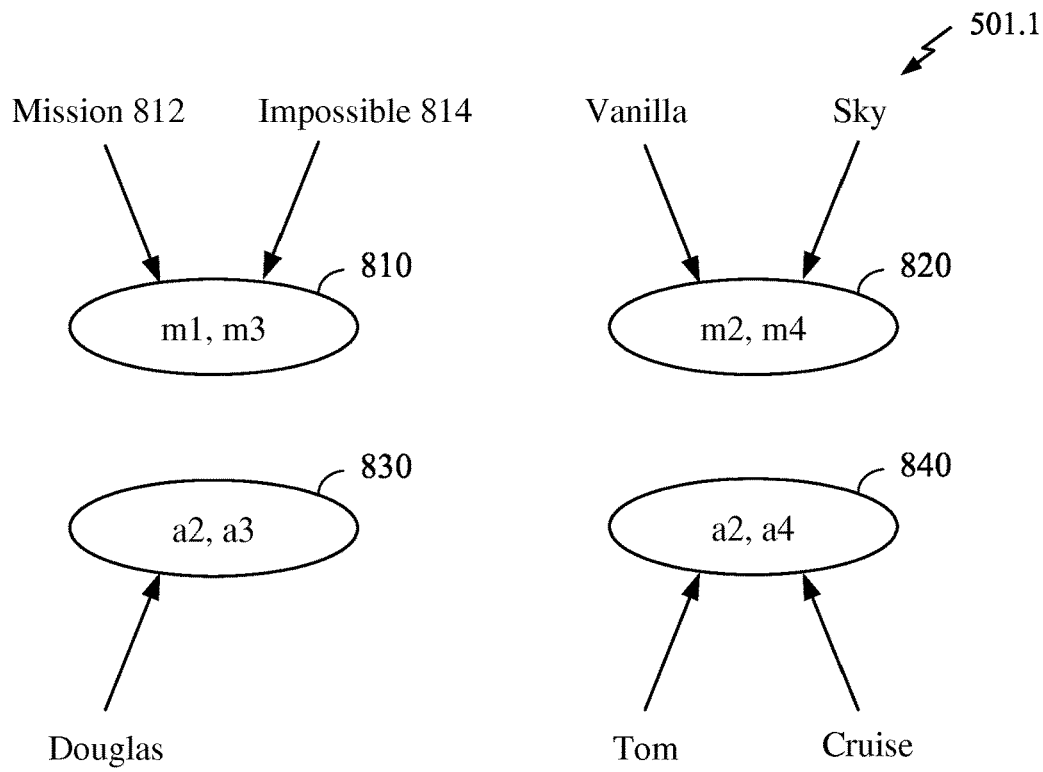
FIG. 8 illustrates an intermediate state of a pairs graph based on the constituent knowledge graphs described hereinabove.

For example, FIG. 8 illustrates a first intermediate state 501.1 of pairs graph 501 following block 710 for the illustrative knowledge graphs 200, 300 earlier described hereinabove. In FIG. 8, pairs 810, 820, 830, 840 represent seed pairs that have been generated from knowledge graphs 200, 300 following block 520. Each of pairs 810, 820, 830, 840 is further shown in FIG. 8 as being associated with one or more representative elements from the output bag of elements of the entity pair, wherein each representative element is shared between the entities in the pair. For example, pair 810 includes entities m1 and m3, which share common elements "Mission" 812 and "Impossible" 814.

Each element associated with a pair is illustratively connected with the pair by an arrow pointing in the direction of the pair.

Following block 710, at block 720, pairs graph 501 is expanded to also include subject and object entities related to entities in existing pairs, e.g., as specified by RDF triples characterizing constituent knowledge graphs 502, 504.

Figure 9:
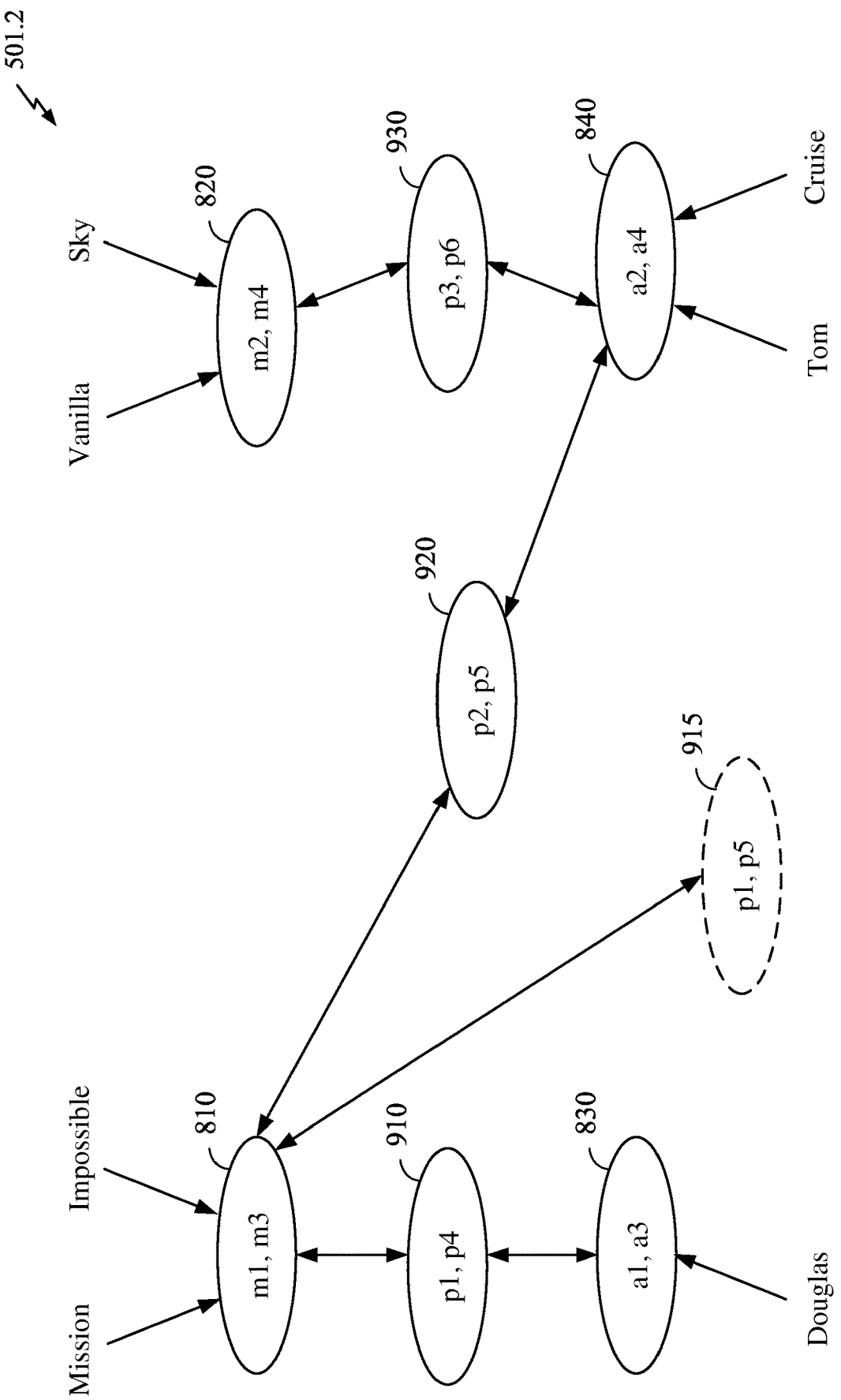
FIG. 9 illustrates another intermediate state of the pairs graph following subject and object expansion.

For example, FIG. 9 illustrates a second intermediate state 501.2 of pairs graph 501, following subject and object expansion at block 720. In FIG. 9, pairs graph 501 has been expanded to also pair 910, composed of entities (p1, p4). In particular, one entity (p1) of pair 910 is the subject of an RDF triple (p1, movie.performance, m1) of graph 200 in which m1 (an entity in existing pair 810) is an object, while another entity (p4) of pair 910 is the subject of an RDF triple (p4, movie.performance, m3) of graph 300 in which m3 (another entity in existing pair 810) is an object. Pairs 920, 930 are similarly related to existing pairs 810, 820, 840, as shown.

It will be appreciated that during the process of expansion at block 720, conflicting pairs may be generated, e.g., wherein an entity in a knowledge graph is paired with more than one other entity in another knowledge graph. For example, pair 915 (p1, p5) in FIG. 9 conflicts with pair 910 (p1, p4)—both pairs 910, 915 cannot exist together, since the performance entity p1 in graph 200 can only correspond to one entity from graph 300 (p4 or p5). Accordingly, one of the conflicting pairs should be removed—inspection shows that pair 915 is incorrect and should be removed. To automatically resolve such conflicts and keep only relevant pairs, techniques employed may include shared terminal attributes and stable marriage heuristics.

Figure 10:
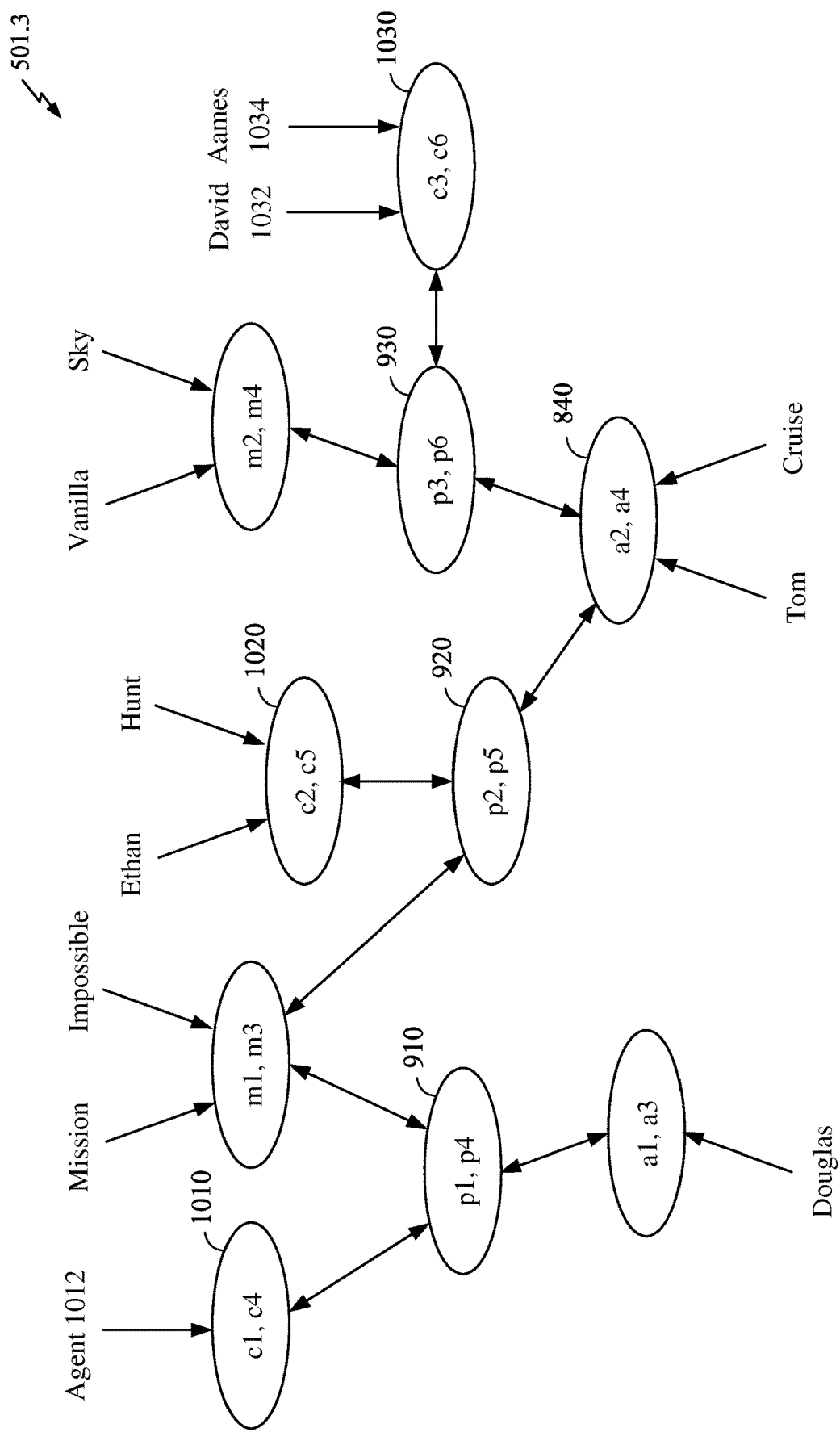
FIG. 10 illustrates yet another intermediate state of the pairs graph.

Following block 720, at block 730, pairs graph 501 is expanded to include entities coupled to relationship entity pairs. For example, FIG. 10 illustrates a third intermediate state 501.3 of pairs graph 501 following block 730. In FIG. 10, pair 1010 (c1, c4) is coupled to relationship entity pair 910, and has accordingly been included in the pairs graph. Similarly, pair 1030 (c3, c6) coupled to relationship entity pair 930 is included. Note elements 1012 ("Agent") and 1032 ("David"), 1034 ("Ames") are also coupled to their respective entity pairs 1010, 1030.

Returning to FIG. 5, following generation of pairs graph 530a by expansion block 530, similarity metric computation for each existing pair in pairs graph 530a is performed at block 540 (also denoted herein a "computation" block or "correlator"). The computed similarity of two entities in an arbitrary pair u is quantified herein as a similarity metric sim(u).

In an exemplary embodiment, sim(u) may be computed based on the presence of matching elements in the bag of elements representations of the two entities in u. In an exemplary embodiment, the elements' contribution to sim(u) may be weighted by their relative information content. For example, a frequently occurring element such as "the" or "of" may be weighted less than elements such as "mission" or "impossible," which occur less often. In a further exemplary embodiment, sim(u) may also account for the computed similarity of other entity pairs connected to and/or in the vicinity of u.

In an exemplary embodiment, sim(u) may be explicitly computed as follows (Equation 3):

$$\text{sim}(u) = \Sigma_w \text{Prob}(w \rightarrow u);$$

where each w represents a primitive (e.g., an element occurring in the output bag of elements), and Prob(w→u) represents the landing probability that a "random surfer" will land at pair u starting from the given primitive w, e.g., according to a random surfer model. In particular, assuming a random surfer continuously starts a trip at the primitive w, then the probability of the surfer landing at node u starting from primitive w will determine the contribution of w to the similarity of the pair of entities in u.

Note Equation 3 expresses sim(u) in terms of w, wherein w may correspond not only to primitives directly associated with u, but also to primitives associated with other pairs connected (directly or indirectly) to u. In particular, if v is any entity pair (also denoted herein as an "extended pair") having w as a primitive, then the probability of landing at pair u starting from w may be expressed as follows (Equation 4):

$$\text{Prob}(w \rightarrow u) = \Sigma_{v \in Vw} P(v) \text{Prob}(v \rightarrow u);$$

wherein P(v) is the probability of landing at v starting from w, Prob(v→u) is the probability of landing at pair u starting from pair v, and Vw is the set of all pairs sharing primitive value w. Note u may itself also be a member of Vw (e.g., if w is common to both u and other pairs connected to u), in which case Prob (v→u)=Prob (u→u)=1, wherein v=u. In general, pairs v connected to u, but not including u itself, may also be denoted herein as v∈Vw, v≠u.

According to the random surfer model, it is assumed that a random surfer, starting at w, either remains at w with probability E, or takes a step in a random direction with probability 1-ϵ. If there are deg(w) (also denoted herein as "degrees of the primitive") possible such directions emanating from w, such that after one iteration the random surfer lands at any of the nodes v∈Vw with probability $$P(v) = \frac{1 - \epsilon}{\deg(w)},$$

then Equation 4 may also be expressed as follows (Equation 5):

$$\text{Prob}(w \rightarrow u) = \sum_{v \in Vw} \frac{1 - \epsilon}{\deg(w)} \text{Prob}(v \rightarrow u);$$

in view of which Equation 3 may be expressed as follows (Equations 6):

$$\text{sim}(u) = \sum_w \sum_{v \in Vw} \frac{1 - \epsilon}{\deg(w)} \text{Prob}(v \rightarrow u); \quad \text{(Equation 6a)}$$

$$\text{sim}(u) \sim \sum_w \frac{1}{\deg(w)} \sum_{v \in Vw} \text{Prob}(v \rightarrow u); \quad \text{(Equation 6b)}$$

wherein ~ denotes "being proportional to."

Changing the order of summation and combining terms for the same vertices, Equation 6b may also be expressed as follows (Equations 7):

$$sim(u) \sim \sum_{v \in V_w} Prob(v \to u) \sum_w \frac{1}{deg(w)}; \quad \text{(Equation 7a)}$$

$$= \sum_{v \in V_w} Prob(v \to u) \cdot iSim(v); \quad \text{(Equation 7b)}$$

wherein $$iSim(v) = \sum_w \frac{1}{deg(w)}$$

denotes the initial similarity metric of node v, and is computed as the sum of reciprocals of the degrees of all primitives for node v.

Figure 11:
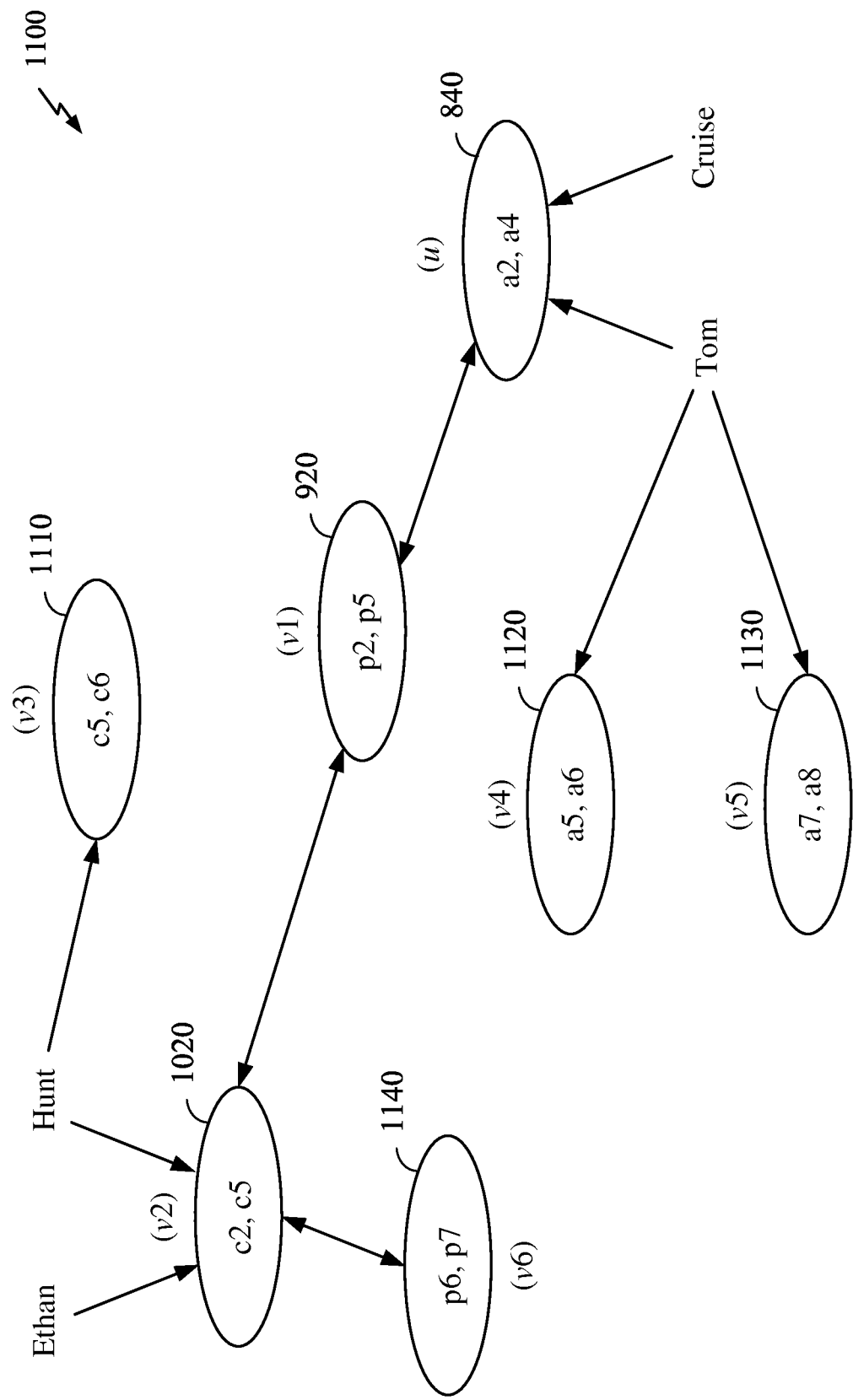
FIG. 11 shows a simplified pairs graph illustrating similarity metric computation such as may be implemented at the computation block.

FIG. 11 shows a simplified pairs graph 1100 illustrating similarity metric computation such as may be implemented at block 540. Note FIG. 11 is described for illustrative purposes only, and is not meant to limit the scope of the present disclosure to any particular entities or computations explicitly shown.

In FIG. 11, suppose it is desired to compute sim(u) for u=node 840 in FIG. 10, corresponding to a pair a2, a4 of actor entities. It is assumed that u is associated with only one explicit attribute "Tom Cruise," corresponding to two primitives "Tom" and "Cruise," though it will be appreciated that an arbitrary node may generally be associated with any plurality of primitives present in an output bag of elements. u is further coupled to node 920 (or v1) corresponding to a pair of performance entities p2, p5, which is in turn coupled to node 1020 (or v2) associated with a pair of character entities c2, c5.

In FIG. 11, it is further assumed that the primitive "Tom" associated with u is also associated with nodes 1120 (or v4) and 1130 (or v5), the primitive "Hunt" associated with v2 is also associated with another node 1110 (or v3), and that v2 is coupled to another node 1140 (or v6).

Based on graph 1100, initial similarity metrics may be calculated using the techniques described hereinabove as follows (Equations 8):

$$iSim(v) = \sum_w \frac{1}{deg(w)}; \quad \text{(Equation 8a)}$$

$$iSim(u) = \sum_w \frac{1}{deg(w)} = \frac{1}{deg(\text{"Tom"})} + \frac{1}{deg(\text{"Cruise"})}; \quad \text{(Equation 8b)}$$

$$iSim(u) = \frac{1}{3} + 1 = 1.33; \quad \text{(Equation 8c)}$$

$$iSim(v2) = \sum_w \frac{1}{deg(w)} = \frac{1}{deg(\text{"Ethan"})} + \frac{1}{deg(\text{"Hunt"})}; \quad \text{(Equation 8d)}$$

$$iSim(v2) = 1 + \frac{1}{2} = 1.5; \quad \text{(Equation 8e)}$$

in view of which sim(u) may then be calculated as follows (Equations 7b, 9):

$$sim(u) \sim \sum_{v \in V_w} Prob(v \to u) \cdot iSim(v); \quad \text{(Equation 7b)}$$

$$sim(u) \sim iSim(u) + \sum_{v \in V_w, v \neq u} Prob(v \to u) \cdot iSim(v); \quad \text{(Equation 9a)}$$

$$= iSim(u) + Prob(v2 \to u) \cdot iSim(v2); \quad \text{(Equation 9b)}$$

$$= 1.33 + Prob(v2 \to v1) \cdot Prob(v1 \to u) \cdot 1.5; \quad \text{(Equation 9c)}$$

If it is assumed that v2 transitions to v1 with probability ½, and v1 transitions to u with probability 1, then Equation 9c may be expressed as follows (Equation 10):

$$sim(u) \sim 1.33 + 0.5 \cdot 1 \cdot 1.5 = 2.08. \quad \text{(Equation 10)}$$

In this manner, similarity metrics may be calculated for all entity pairs in a pairs graph. It will be appreciated that the similarity metric computation described hereinabove subsumes all shared primitives w of every pair v into an initial similarity metric iSim(v). Accordingly, the values of all terminal nodes (e.g., primitives w) may be removed from the pairs graph once iSim(v) is calculated. This significantly eases memory requirements for constructing the pairs graph, and further simplifies computation by reducing starting points for the random surfer to only non-terminal nodes.

Figure 12:
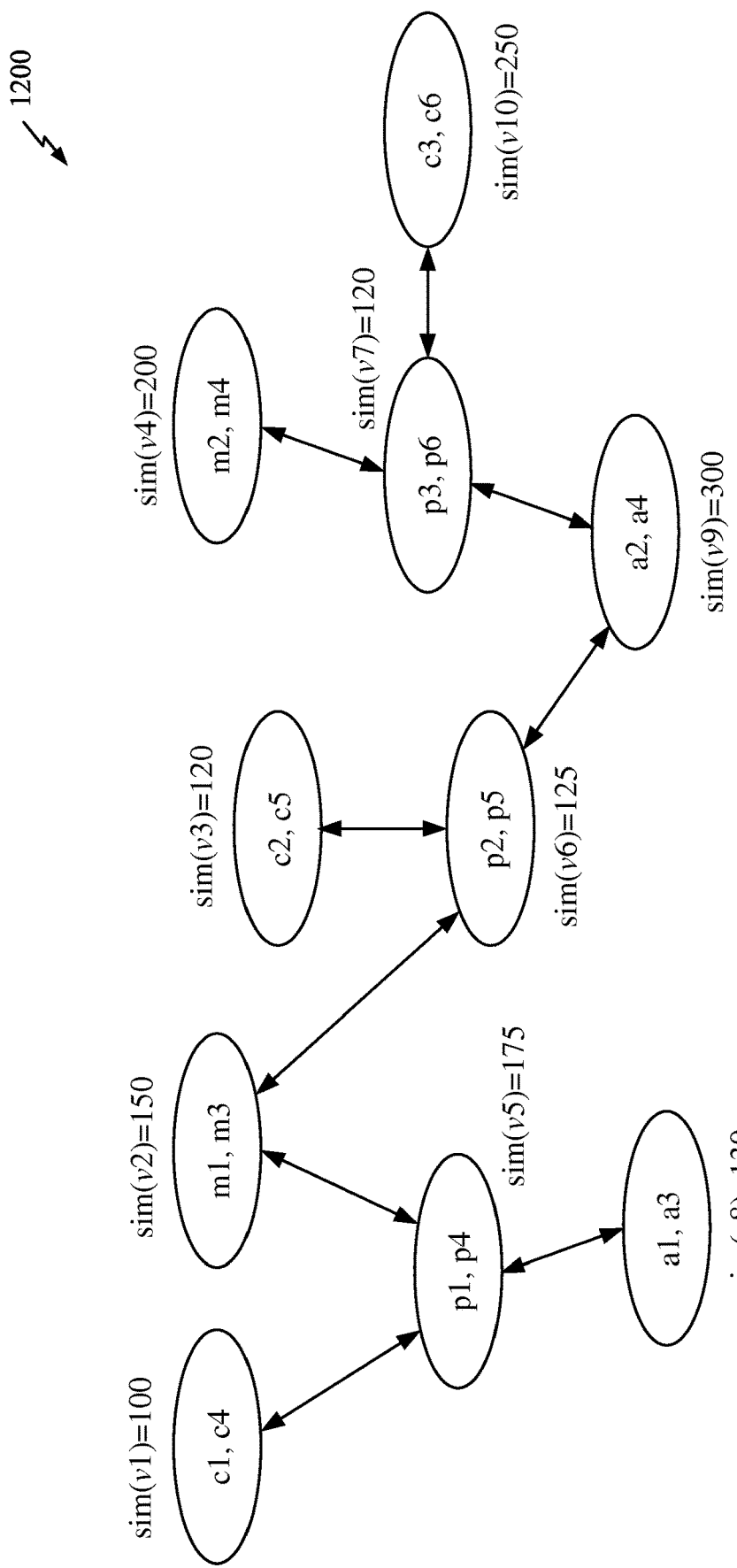
FIG. 12 illustratively shows computed similarity metrics for a simplified exemplary pairs graph.

Following similarity computation at block 540, similarity metrics sim(u) are available for each pair in the pairs graph, as illustratively shown in FIG. 12 for a simplified exemplary pairs graph 1200. Note pairs graph 1200 is shown for illustrative purposes only, and is not meant to limit the scope of the present disclosure to any particular types or sizes of pairs graphs, or to any magnitudes or ranges of values for the similarity metrics that can be accommodated. Further note the values of the similarity metrics shown in FIG. 12 are shown for illustrative purposes only, and are not meant to correspond to actual calculations for any particular pairs graphs or attributes discussed elsewhere herein.

In FIG. 12, each pair is assigned a vertex name vn, wherein n represents an index, and is shown with a corresponding computed similarity metric sim(vn). In an exemplary embodiment, sim(vn) may be computed according to the techniques described hereinabove with reference to block 540.

At block 550, also denoted herein an "aggregator," matching resolution is performed to translate the computed similarity metrics into a final determination of which pairs constitute a match, and are to be included in the final pairs graph 501. In particular, suppose there is an entity a from a first knowledge graph, and a plurality of candidate entities b1, b2, etc., from a second knowledge graph, with which entity a can be paired up. Following block 540, similarity metrics sim(a, b1), sim (a, b2), etc., will be available for each of the candidate pairings (a, b1), (a, b2), etc. In an exemplary embodiment, the final selection of which pairing constitutes a match may be made by selecting that candidate pairing (a, b*) having a corresponding similarity metric sim (a, b*) that is much greater than other candidate pairings for entity a, e.g., sim (a, b*)>2·sim (a, bx) for all bx≠b*. Such a technique for matching resolution may also be denoted herein as "sparse neighborhood" determination.

It will be appreciated that, given the computed similarity metrics from block 540 as described hereinabove, other techniques for performing matching resolution other than the sparse neighborhood determination may also be readily adopted, e.g., taking into account other statistics of candidate pairings and also other entities to which the candidate pairings are connected, etc. Such alternative exemplary embodiments are contemplated to be within the scope of the present disclosure.

Figure 13:
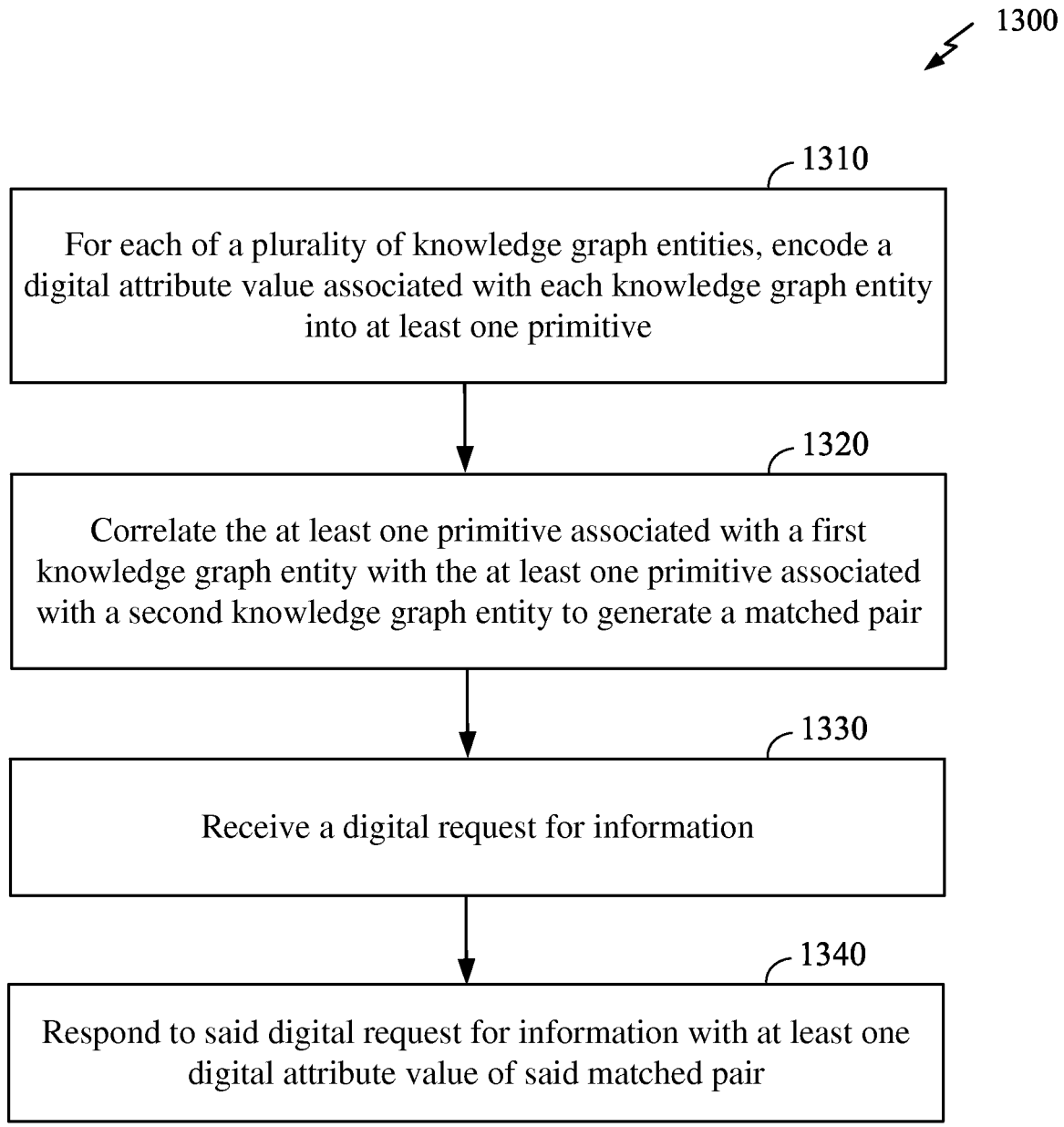
FIG. 13 illustrates an exemplary embodiment of a method according to the present disclosure.

FIG. 13 illustrates an exemplary embodiment 1300 of a method according to the present disclosure. Note FIG. 13 is shown for illustrative purposes only, and is not meant to limit the scope of the present disclosure to any particular methods explicitly described.

In FIG. 13, at block 1310, for each of a plurality of knowledge graph entities, a digital attribute value associated with each knowledge graph entity is encoded into at least one primitive.

At block 1320, the at least one primitive associated with a first knowledge graph entity is correlated with the at least one primitive associated with a second knowledge graph entity to generate a matched pair.

At block 1330, a digital request for information is received.

At block 1340, said digital request for information is responded to with at least one digital attribute value of one of said matched pair.

Figure 14:
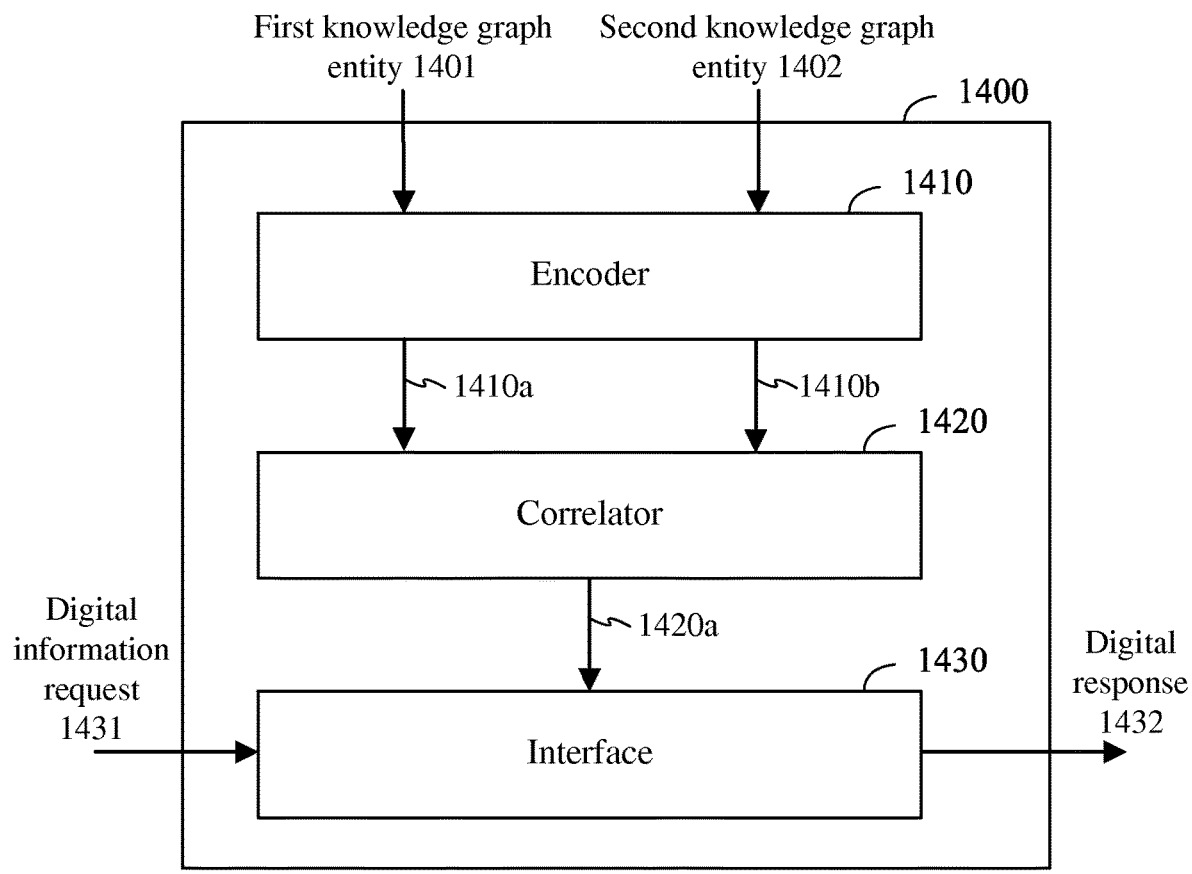
FIG. 14 illustrates an exemplary embodiment of an apparatus according to the present disclosure.

FIG. 14 illustrates an exemplary embodiment 1400 of an apparatus according to the present disclosure. Note FIG. 14 is shown for illustrative purposes only, and is not meant to limit the scope of the present disclosure to any particular apparatus explicitly described.

In FIG. 14, an encoder 1410 encoding, for each of a plurality of knowledge graph entities 1401, 1402, a digital attribute value 1410*a*, 1410*b* associated with each knowledge graph entity into at least one primitive. A correlator 1420 correlates the at least one primitive associated with a first knowledge graph entity with the at least one primitive associated with a second knowledge graph entity to generate a matched pair 1420*a*.

An interface 1430 receives a digital request for information 1431, and responds to said digital request for information with at least one digital attribute value 1432 of said matched pair.

Figure 15:
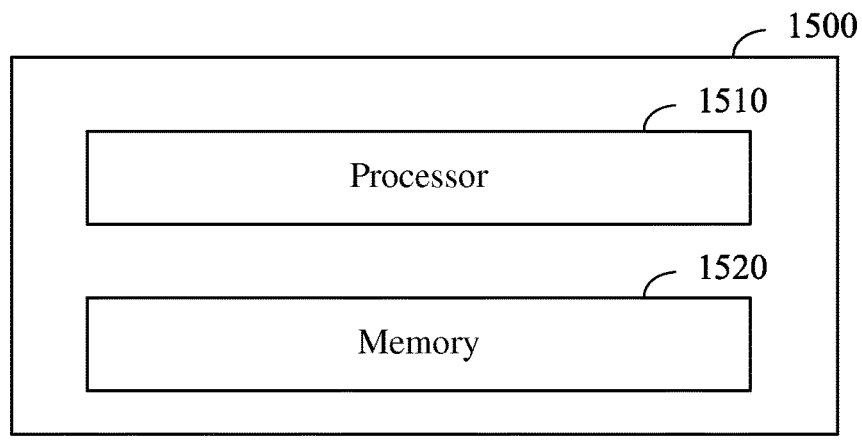
FIG. 15 schematically shows a non-limiting computing system that may perform one or more of the above described methods and processes.

FIG. 15 schematically shows a non-limiting computing system 1500 that may perform one or more of the above described methods and processes. Computing system 1500 is shown in simplified form. It is to be understood that virtually any computer architecture may be used without departing from the scope of this disclosure. In different embodiments, computing system 1500 may take the form of a mainframe computer, server computer, desktop computer, laptop computer, tablet computer, home entertainment computer, network computing device, mobile computing device, mobile communication device, gaming device, etc.

Computing system 1500 includes a processor 1510 and a memory 1520. Computing system 1500 may optionally include a display subsystem, communication subsystem, sensor subsystem, camera subsystem, and/or other components not shown in FIG. 15. Computing system 1500 may also optionally include user input devices such as keyboards, mice, game controllers, cameras, microphones, and/or touch screens, for example.

Processor 1510 may include one or more physical devices configured to execute one or more instructions. For example, the processor may be configured to execute one or more instructions that are part of one or more applications, services, programs, routines, libraries, objects, components, data structures, or other logical constructs. Such instructions may be implemented to perform a task, implement a data type, transform the state of one or more devices, or otherwise arrive at a desired result.

The processor may include one or more processors that are configured to execute software instructions. Additionally or alternatively, the processor may include one or more hardware or firmware logic machines configured to execute hardware or firmware instructions. Processors of the processor may be single core or multicore, and the programs executed thereon may be configured for parallel or distributed processing. The processor may optionally include individual components that are distributed throughout two or more devices, which may be remotely located and/or configured for coordinated processing. One or more aspects of the processor may be virtualized and executed by remotely accessible networked computing devices configured in a cloud computing configuration.

Memory 1520 may include one or more physical devices configured to hold data and/or instructions executable by the processor to implement the methods and processes described herein. When such methods and processes are implemented, the state of memory 1520 may be transformed (e.g., to hold different data).

Memory 1520 may include removable media and/or built-in devices. Memory 1520 may include optical memory devices (e.g., CD, DVD, HD-DVD, Blu-Ray Disc, etc.), semiconductor memory devices (e.g., RAM, EPROM, EEPROM, etc.) and/or magnetic memory devices (e.g., hard disk drive, floppy disk drive, tape drive, MRAM, etc.), among others. Memory 1520 may include devices with one or more of the following characteristics: volatile, nonvolatile, dynamic, static, read/write, read-only, random access, sequential access, location addressable, file addressable, and content addressable. In some embodiments, processor 1510 and memory 1520 may be integrated into one or more common devices, such as an application specific integrated circuit or a system on a chip.

Memory 1520 may also take the form of removable computer-readable storage media, which may be used to store and/or transfer data and/or instructions executable to implement the herein described methods and processes. Removable computer-readable storage media 1530 may take the form of CDs, DVDs, HD-DVDs, Blu-Ray Discs, EEPROMs, and/or floppy disks, among others.

It is to be appreciated that memory 1520 includes one or more physical devices that stores information. The terms "module," "program," and "engine" may be used to describe an aspect of computing system 1500 that is implemented to perform one or more particular functions. In some cases, such a module, program, or engine may be instantiated via processor 1510 executing instructions held by memory 1520. It is to be understood that different modules, programs, and/or engines may be instantiated from the same application, service, code block, object, library, routine, API, function, etc. Likewise, the same module, program, and/or engine may be instantiated by different applications, services, code blocks, objects, routines, APIs, functions, etc. The terms "module," "program," and "engine" are meant to encompass individual or groups of executable files, data files, libraries, drivers, scripts, database records, etc.

In an aspect, computing system 1500 may correspond to a computing device including a memory 1520 holding instructions executable by a processor 1510 to receive an information request from a user; receive data from a knowledge database relevant to said information request; and transmit said data to the user, the knowledge database being constructed by: receiving attribute values of a first knowledge graph comprising a plurality of first entities and first relationships; receiving attribute values of a second knowledge graph comprising a plurality of second entities and second relationships; generating at least one primitive for each of said received attribute values of said first and second knowledge graphs; based on said at least one primitive, correlating at least one first entity with at least one second entity to generate at least one matched pair; and generating a composite knowledge graph comprising a plurality of entities and relationships, said generating the composite knowledge graph comprising identifying at least one entity of the composite knowledge graph with said at least one matched pair. Note such a computing device will be understood to correspond to a process, machine, manufacture, or composition of matter. Furthermore, it will be understood that a memory, as referenced in this specification and in the claims, does not correspond to or encompass a carrier wave or signal per se, e.g., an electrical or electromagnetic signal in the state of propagating through some medium.

Figure 16:
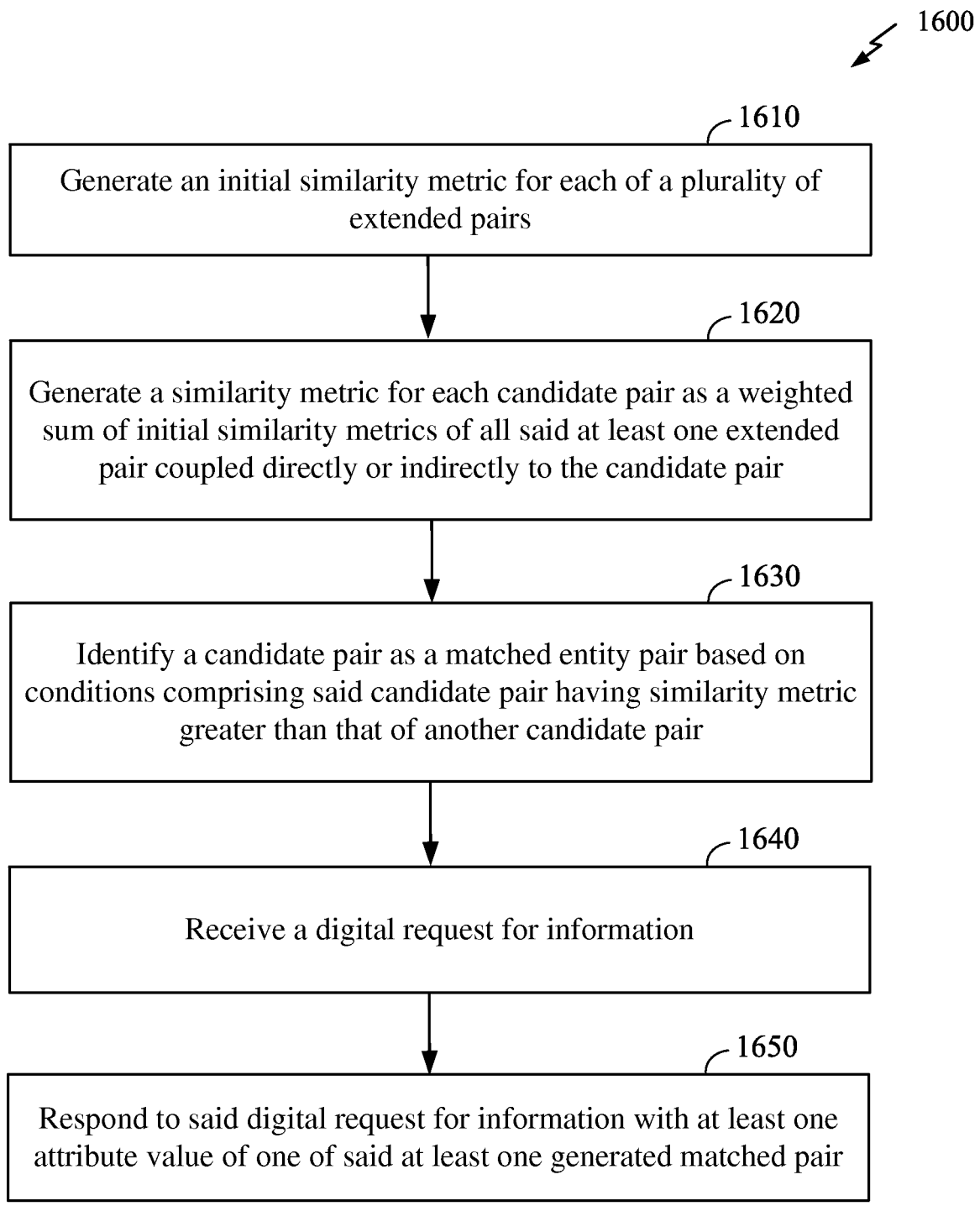
FIG. 16 illustrates an alternative exemplary embodiment of a method according to the present disclosure.

FIG. 16 illustrates an alternative exemplary embodiment 1600 of a method according to the present disclosure. Note FIG. 16 is shown for illustrative purposes only, and is not meant to limit the scope of the present disclosure to any particular methods explicitly described.

In FIG. 16, at block 1610, an initial similarity metric is generated for each of a plurality of extended pairs. Each of said plurality of extended pairs may be coupled to at least one candidate pair. Each of said at least one candidate pair and said plurality of extended pairs may comprise a first knowledge graph entity and a second knowledge graph entity. Each knowledge graph entity may have at least one associated attribute value.

At block 1620, a similarity metric is generated for each candidate pair as a weighted sum of initial similarity metrics of all said at least one extended pair coupled directly or indirectly to the candidate pair. Each weight may comprise a probability of landing at the candidate pair starting from the respective extended pair.

At block 1630, a candidate pair is identified as a matched entity pair based on conditions comprising said candidate pair having similarity metric greater than that of another candidate pair.

At block 1640, a digital request for information is received.

At block 1650, said digital request for information is responded to with at least one attribute value of said matched entity pair.

In this specification and in the claims, it will be understood that when an element is referred to as being "connected to" or "coupled to" another element, it can be directly connected or coupled to the other element or intervening elements may be present. In contrast, when an element is referred to as being "directly connected to" or "directly coupled to" another element, there are no intervening elements present. Furthermore, when an element is referred to as being "electrically coupled" to another element, it denotes that a path of low resistance is present between such elements, while when an element is referred to as being simply "coupled" to another element, there may or may not be a path of low resistance between such elements.

The functionality described herein can be performed, at least in part, by one or more hardware and/or software logic components. For example, and without limitation, illustrative types of hardware logic components that can be used to implement special-purpose computers with the functionality described herein include microprocessors, Field-programmable Gate Arrays (FPGAs), Program-specific Integrated Circuits (ASICs), Program-specific Standard Products (ASSPs), System-on-a-chip systems (SOCs), Complex Programmable Logic Devices (CPLDs), etc.

While the invention is susceptible to various modifications and alternative constructions, certain illustrated embodiments thereof are shown in the drawings and have been described above in detail. It should be understood, however, that there is no intention to limit the invention to the specific forms disclosed, but on the contrary, the intention is to cover all modifications, alternative constructions, and equivalents falling within the spirit and scope of the invention.

The invention claimed is:

1. A method comprising:
   encoding a date or time associated with a first entity from a first knowledge graph into a plurality of date or time precision levels, each of the plurality of date or time precision levels specifying a distinct time or date resolution;
   encoding a date or time associated with a second entity from a second knowledge graph into said plurality of date or time precision levels, wherein the second knowledge graph is separate from the first knowledge graph;
   correlating the plurality of precision levels associated with each of the first and second entities to generate a matched pair;
   receiving a digital request for information;
   responding to said digital request for information with at least one digital attribute value associated with said matched pair;
   wherein correlating comprises:
   computing a similarity metric for each of a plurality of candidate pairs, each candidate pair comprising a first knowledge graph candidate entity and a second knowledge graph candidate entity;
   and selecting said at least one matched pair from the plurality of candidate pairs based on the computed similarity metrics, and wherein computing the similarity metric for each candidate pair comprises:
   identifying at least one extended pair associated with a primitive, said at least one extended pair being coupled directly or indirectly to said candidate pair; for each of said at least one extended pair, computing an initial similarity metric;
   and generating the similarity metric as the weighted sum of initial similarity metrics of all said at least one extended pair coupled to said candidate pair, the weight comprising a probability of landing at the candidate pair starting from the respective extended pair.

2. The method of claim 1, further comprising encoding at least one digital attribute value other than date or time using multi-resolution encoding.

3. The method of claim 2, the encoding further comprising at least one of:
   generating a primitive for every distinct text or string n-gram present in a corresponding digital attribute value;
   generating a primitive for each of at least one lower precision rounded version of a number present in a corresponding digital attribute value;
   generating a primitive for each normalized version of a URL present in a corresponding digital attribute value;
   generating a primitive comprising a concatenation of a digital attribute name with a generated primitive;
   and generating a primitive comprising a concatenation of an identity attribute value with a generated primitive;
   wherein the correlating further comprises correlating at least one generated primitive associated with the first entity from the first knowledge graph with at least one generated primitive associated with the second entity from the second knowledge graph to generate a matched pair.

4. The method of claim 1, the correlating further comprising generating at least one seed pair comprising a first seed entity from the first knowledge graph and a second seed entity from the second knowledge graph, and generating at least one expansion pair coupled to the at least one seed pair, the at least one expansion pair comprising a first expansion entity from the first knowledge graph and a second expansion entity from the second knowledge graph.

5. The method of claim 4, the generating the at least one seed pair comprising:
   selecting an entity class;
   computing a word score for each word associated with a digital attribute value of each entity having the selected entity class;
   computing similarity scores for a plurality of candidate pairs based on the computed word scores, each candidate pair comprising entities sharing an entity class and at least one word; and
   selecting at least one of the plurality of candidate pairs based on the similarity score as the at least one seed pair.

6. The method of claim 1, the correlating comprising:
   computing a similarity metric for each of a plurality of candidate pairs, each candidate pair comprising a first candidate entity from the first knowledge graph and a second candidate entity from the second knowledge graph; and
   selecting said at least one matched pair from the plurality of candidate pairs based on the computed similarity metrics.

7. The method of claim 6, the computing the similarity metric for a candidate pair comprising:
   identifying at least one extended pair associated with a primitive, said at least one extended pair being coupled directly or indirectly to said candidate pair;
   for each of said at least one extended pair, computing an initial similarity metric as the sum, over all primitives associated with said extended pair, of reciprocals of the degree of each said primitive; and
   generating the similarity metric as the weighted sum of initial similarity metrics of all said at least one extended pair coupled to said candidate pair, the weight comprising the probability of landing at the candidate pair starting from the respective extended pair.

8. The method of claim 7, the correlating further comprising, after said computing the similarity metric for each candidate pair, resolving the candidate pair as a matched pair by comparing the similarity metrics of a plurality of other pairs sharing an entity with the corresponding candidate pair.

9. An apparatus comprising a processor and memory storing instructions for causing the processor to execute steps comprising:
   encoding a first date or time associated with a first entity from a first knowledge graph into a plurality of date or time precision levels, the encoder further encoding a second date or time associated with a second entity from a second knowledge graph separate from the first knowledge graph into the plurality of date or time precision levels, each of the plurality of date or time precision levels specifying a distinct time or date resolution;
   correlating the plurality of date or time precision levels associated with the first and second entities to generate a matched pair;
   receiving a digital request for information, and responding to said digital request for information with at least one digital attribute value associated with said matched pair;
   wherein correlating comprises:
   computing a similarity metric for each of a plurality of candidate pairs, each candidate pair comprising a first knowledge graph candidate entity and a second knowledge graph candidate entity;
   and selecting said at least one matched pair from the plurality of candidate pairs based on the computed similarity metrics,
   and wherein computing the similarity metric for each candidate pair comprises:
   identifying at least one extended pair associated with a primitive, said at least one extended pair being coupled directly or indirectly to said candidate pair;
   for each of said at least one extended pair, computing an initial similarity metric; and generating the similarity metric as the weighted sum of initial similarity metrics of all said at least one extended pair coupled to said candidate pair, the weight comprising a probability of landing at the candidate pair starting from the respective extended pair.

10. The apparatus of claim 9, the memory further storing instructions for causing the processor to encode at least one digital attribute value other than date or time using multi-resolution encoding.

11. The apparatus of claim 10, the memory further storing instructions for causing the processor to generate at least one seed pair comprising a first seed entity from the first knowledge graph and a second seed entity from the second knowledge graph, and generate at least one expansion pair coupled to the at least one seed pair, the at least one expansion pair comprising a first expansion entity from the first knowledge graph and a second expansion entity from the second knowledge graph.

12. The apparatus of claim 11, the memory further storing instructions for causing the processor to generate the at least one seed pair by:
   selecting an entity class;
   computing a word score for each word associated with an attribute value of each entity having the selected entity class;
   computing similarity scores for a plurality of candidate pairs based on the computed word scores, each candidate pair comprising entities sharing an entity class and at least one word; and
   selecting at least one of the plurality of candidate pairs based on the similarity score as the at least one seed pair.

13. The apparatus of claim 9, the memory further storing instructions for causing the processor to correlate a first additional entity from the first knowledge graph with a second additional entity from the second knowledge graph by:
   computing a similarity metric for each of a plurality of candidate pairs, each candidate pair comprising a first candidate entity from the first knowledge graph and a second candidate entity from the second knowledge graph; and
   selecting said at least one matched pair from the plurality of candidate pairs based on the computed similarity metrics.

14. The apparatus of claim 13, the memory further storing instructions for causing the processor to compute the similarity metric for each candidate pair by:

identifying at least one extended pair associated with a primitive, said at least one extended pair being coupled directly or indirectly to said candidate pair;

for each of said at least one extended pair, computing an initial similarity metric as the sum, over all primitives associated with said extended pair, of reciprocals of the degree of each said primitive; and generating the similarity metric as the weighted sum of initial similarity metrics of all said at least one extended pair coupled to said candidate pair, the weight comprising the probability of landing at the candidate pair starting from the respective extended pair.

15. The apparatus of claim 14, the memory further storing instructions for causing the processor to compute the similarity metric for each candidate pair by, after said computing the initial similarity metric for an extended pair, and prior to said generating the similarity metric as the weighted sum, removing from memory the association between primitives and entities of said extended pair.

16. The apparatus of claim 15, the memory further storing instructions for causing the processor to, after computing the similarity metric for each candidate pair, resolve the candidate pair as a matched pair by comparing the similarity metrics of a plurality of other pairs sharing an entity with the corresponding candidate pair.

17. A method comprising:

generating an initial similarity metric for each of a plurality of extended pairs, each of said plurality of extended pairs coupled to at least one candidate pair, each of said at least one candidate pair and said plurality of extended pairs comprising a first entity from a first knowledge graph and a second entity from a second knowledge graph separate from the first knowledge graph, the first and second entity of each pair sharing a common date or time as encoded into a plurality of date or time precision levels, each of the plurality of date or time precision levels specifying a distinct time or date resolution, each entity having at least one associated attribute value;

and generating a similarity metric for each candidate pair as a weighted sum of initial similarity metrics of all said at least one extended pair coupled directly or indirectly to the candidate pair, each weight comprising a probability of landing at the candidate pair starting from the respective extended pair;

correlating the plurality of date or time precision levels associated with each of the first and second entities to generate a matched entity pair;

receiving a digital request for information;

and responding to said digital request for information with the at least one attribute value of said matched entity pair;

wherein correlating comprises:

computing a similarity metric for each of a plurality of candidate pairs, each candidate pair comprising a first knowledge graph candidate entity and a second knowledge graph candidate entity;

and selecting said at least one matched entity pair from the plurality of candidate pairs based on the computed similarity metrics, and wherein computing the similarity metric for each candidate pair comprises:

identifying at least one extended pair associated with a primitive, said at least one extended pair being coupled directly or indirectly to said candidate pair;

for each of said at least one extended pair, computing an initial similarity metric;

and generating the similarity metric as the weighted sum of initial similarity metrics of all said at least one extended pair coupled to said candidate pair, the weight comprising a probability of landing at the candidate pair starting from the respective extended pair.

18. The method of claim 17, the generating the initial similarity metric for each extended pair comprising computing the sum, over at least one primitive associated with said extended pair, of reciprocals of a degree of each primitive.

19. The method of claim 18, further comprising, after said generating the initial similarity metric for each extended pair, removing from a memory an association between an extended pair and its corresponding at least one primitive.

20. The method of claim 17, at least one of said plurality of extended pairs coupled to at least one further extended pair having an associated further initial similarity metric, the generating the initial similarity metric for such extended pair comprising computing a weighted sum of further initial similarity metrics of all said at least one further extended pair, each weight comprising a probability of landing at the extended pair starting from the respective further extended pair.

* * * * *